(12) United States Patent
Schrader

(10) Patent No.: US 10,953,423 B2
(45) Date of Patent: Mar. 23, 2021

(54) FLUID DISPENSING APPARATUS INCLUDING PHASED VALVES AND METHODS OF DISPENSING FLUID USING SAME

(71) Applicant: Capstan Ag Systems, Inc., Topeka, KS (US)

(72) Inventor: Kale Schrader, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 80 days.

(21) Appl. No.: 16/392,056

(22) Filed: Apr. 23, 2019

(65) Prior Publication Data
US 2019/0321844 A1 Oct. 24, 2019

Related U.S. Application Data

(60) Provisional application No. 62/661,344, filed on Apr. 23, 2018.

(51) Int. Cl.
*F16K 31/12* (2006.01)
*B05B 12/00* (2018.01)
(Continued)

(52) U.S. Cl.
CPC .......... *B05B 12/004* (2013.01); *A01B 79/005* (2013.01); *A01B 79/02* (2013.01); *B05B 1/30* (2013.01); *Y10T 137/7761* (2015.04)

(58) Field of Classification Search
CPC ............................................. Y10T 137/86389
(Continued)

(56) References Cited

U.S. PATENT DOCUMENTS 4,227,231 A   10/1980   Hansen et al.
4,590,576 A * 5/1986   Elpiner ................ G05D 7/0635
                                                  137/624.11
(Continued)

FOREIGN PATENT DOCUMENTS

CN   105569859 A   5/2016
EP      1346637 A1   9/2003
EP      2165770 A1   3/2010

OTHER PUBLICATIONS

Written Opinion of the International Preliminary Examining Authority issued in connection with International Application No. PCT/US2018/045160, dated Jun. 28, 2019, 5 pages.
(Continued)

*Primary Examiner* — Robert K Arundale
(74) *Attorney, Agent, or Firm* — Armstrong Teasdale LLP

(57) ABSTRACT

A method of dispensing fluid from an apparatus includes determining a phase offset to separate actuation of a plurality of valve sub-sets into phases and determining a sub-phase offset to separate actuation of valves within each of the plurality of valve sub-sets. The method also includes sequentially actuating valves in a first sub-set based on the sub-phase offset, and sequentially actuating valves in a second sub-set based on the phase offset and the sub-phase offset such that (i) at least one valve in the second sub-set is actuated out of phase from a preceding valve in the first sub-set by the phase offset; and (ii) the at least one valve in the second sub-set is actuated out of phase from a preceding valve in the second sub-set by the sub-phase offset.

26 Claims, 14 Drawing Sheets

(51) Int. Cl.
  *A01B 79/00* (2006.01)
  *B05B 1/30* (2006.01)
  *A01B 79/02* (2006.01)

(58) Field of Classification Search
  USPC .................................................... 239/66, 69
  See application file for complete search history.

(56) References Cited

U.S. PATENT DOCUMENTS

| | | | |
|---|---|---|---|
| 4,661,766 | A | 4/1987 | Hoffman et al. |
| 4,729,056 | A | 3/1988 | Edwards et al. |
| 4,967,309 | A | 10/1990 | Hoffman |
| 5,052,174 | A | 10/1991 | Bak |
| 5,134,961 | A | 8/1992 | Giles et al. |
| 5,324,359 | A | 6/1994 | Cleveland et al. |
| 5,499,157 | A | 3/1996 | Younessi et al. |
| 5,653,389 | A * | 8/1997 | Henderson .......... A01M 7/0089 239/172 |
| 5,704,546 | A | 1/1998 | Henderson et al. |
| 5,881,919 | A | 3/1999 | Womac et al. |
| 5,908,161 | A | 6/1999 | Womac et al. |
| 5,967,066 | A | 10/1999 | Giles et al. |
| 6,019,347 | A | 2/2000 | Adams et al. |
| 6,302,080 | B1 | 10/2001 | Kato et al. |
| 6,324,046 | B1 | 11/2001 | Kadah |
| 6,374,624 | B1 | 4/2002 | Cholkeri et al. |
| 6,493,204 | B1 | 12/2002 | Glidden et al. |
| 7,311,004 | B2 | 12/2007 | Giles |
| 7,502,665 | B2 | 3/2009 | Giles et al. |
| 7,742,842 | B2 | 6/2010 | Giles et al. |
| 7,826,930 | B2 | 11/2010 | Giles et al. |
| 8,191,795 | B2 | 6/2012 | Grimm et al. |
| 9,435,458 | B2 | 9/2016 | Needham et al. |
| 9,635,848 | B2 | 5/2017 | Needham et al. |
| 10,441,965 | B2 | 10/2019 | Feldhaus et al. |
| 2005/0279780 | A1 | 12/2005 | Evans et al. |
| 2006/0102234 | A1 | 5/2006 | Meisel |
| 2006/0151544 | A1 | 7/2006 | Greenwald et al. |
| 2006/0225489 | A1 | 10/2006 | Giles et al. |
| 2006/0265106 | A1 | 11/2006 | Giles et al. |
| 2006/0273189 | A1 | 12/2006 | Grimm et al. |
| 2007/0188967 | A1 | 8/2007 | Smith et al. |
| 2008/0230624 | A1 | 9/2008 | Giles et al. |
| 2009/0213519 | A1 | 8/2009 | Bedingfield |
| 2009/0309054 | A1 | 12/2009 | Haller et al. |
| 2010/0032492 | A1 | 2/2010 | Grimm et al. |
| 2010/0259861 | A1 | 10/2010 | Wendt |
| 2012/0228395 | A1 | 9/2012 | Needham et al. |
| 2013/0027833 | A1 | 1/2013 | Rabe et al. |
| 2014/0299673 | A1 | 10/2014 | Grimm et al. |
| 2015/0300522 | A1 | 10/2015 | Ito et al. |
| 2015/0367357 | A1 | 12/2015 | Humpal et al. |
| 2015/0367358 | A1 * | 12/2015 | Funseth .................... B05B 1/20 239/159 |
| 2015/0375247 | A1 * | 12/2015 | Funseth .................. B05B 1/169 239/68 |
| 2016/0203931 | A1 | 7/2016 | Ramsey et al. |
| 2016/0265811 | A1 | 9/2016 | Furmanek et al. |
| 2017/0120263 | A1 | 5/2017 | Needham et al. |
| 2017/0122268 | A1 | 5/2017 | Hashimoto et al. |
| 2017/0284556 | A1 | 10/2017 | Omekanda et al. |

OTHER PUBLICATIONS

International Search Report and Written Opinion in connection with International Application PCT/US2018/045160, dated Nov. 21, 2018, 13 pages.

International Preliminary Report on Patentability issued from the International Preliminary Examining Authority in connection with International Application No. PCT/US2018/045160, dated Oct. 15, 2019, 7 pages.

* cited by examiner

FLUID DISPENSING APPARATUS INCLUDING PHASED VALVES AND METHODS OF DISPENSING FLUID USING SAME

CROSS-REFERENCE TO RELATED APPLICATIONS

This application claims priority to U.S. Provisional Patent Application Ser. No. 62/661,344, filed on Apr. 23, 2018, the disclosure of which is hereby incorporated by reference in its entirety.

BACKGROUND

The present disclosure relates generally to apparatus and methods for dispensing fluid and, more particularly, to fluid dispensing apparatus and methods using phased valves to control the emission of fluid through fluid dispensing apparatus.

In the agricultural industry, fluid dispensing apparatus are used to dispense agrochemicals. For example, some agrochemicals such as crop protection agents and many fertilizers are applied as liquid solutions, suspensions, and emulsions that are sprayed onto the target fields. Certain agrochemicals, such as anhydrous ammonia, are dispensed into soil through dispensing tubes positioned behind knives or plows that prepare the soil for application.

Typically, the agrochemical liquid is supplied by powered pumps to nozzles and/or other dispensers connected to a distribution conduit. Pulse width modulation (PWM) of the liquid supplied to each spray nozzle is an alternative to system pressure variation for flow control and is now a mature technology adopted in the U.S., Canada, and Australia. For example, known applications for PWM flow control systems are disclosed in U.S. Pat. No. 5,134,961 (Giles et al.), U.S. Pat. No. 5,653,389 (Henderson et al.), U.S. Pat. No. 7,311,004 (Giles) and U.S. Pat. No. 7,502,665 (Giles et al.) and U.S. Patent Application Publication Nos. 2006/0273189 (Grimm et al.) and 2010/0032492 (Grimm et al.), all of which are hereby incorporated by reference.

In a PWM flow control system, the fluid flow is interrupted in a continuously cyclic timed sequence by an actuator positioned at the nozzle inlet. The fluid pressure may be essentially held constant at a desired value to achieve a desired droplet size spectrum during the pulsing flow control. Studies have shown that changes to droplet size distributions of modulated sprays are negligible and that PWM flow control methods may be used as a form of droplet size control. Because PWM flow control systems allow for flow rate changes at constant pressures, manipulation of the system pressure essentially acts as a system-wide droplet size controller.

In such systems, valves are connected along the distribution conduit and control discharge of the liquid from the distribution conduit and through the dispensers. The valves may be controlled individually or in groups and may be pulsed between different positions to control the flow rate and other flow characteristics. However, the actuation of the valves between an opened position and a closed position may cause uneven fluid flow through the distribution conduit, e.g., the liquid sloshes within the distribution conduit. In addition, opening or closing multiple valves at the same time may cause rapid pressure drops or spikes within the distribution conduit. Moreover, opening multiple valves at the same time may result in a large instantaneous power draw on the electrical system.

Typically, operation of the valves is phased. For example, sometimes, some of the valves are moved to the opened position at a first time while the remaining valves are maintained in the closed position. The remaining valves may be moved to the opened position at a second time. This phasing of the valves increases the operating efficiency of the fluid dispensing apparatus and reduces misapplication of the fluid. However, uneven fluid flow, pressure spikes, and current spikes may still occur because the valves in each phase are actuated at the same time. Accordingly, current valve phasing techniques may be less than optimal for certain applications.

Thus, a need currently exists for improved apparatus and methods for controlling agricultural dispensing systems including phased valves.

BRIEF DESCRIPTION

In one aspect, a method of dispensing fluid from a fluid dispensing apparatus including a plurality of electrically-actuated valves includes supplying fluid to a distribution conduit of the fluid dispensing apparatus. The valves are connected to the distribution conduit and configured to regulate fluid flow out of the distribution conduit. The plurality of valves includes a plurality of valve sub-sets including a first sub-set and a second sub-set. The method also includes determining a phase offset to separate actuation of the plurality of valve sub-sets into phases, and determining a sub-phase offset to separate actuation of valves within each of the plurality of valve sub-sets. The method also includes sequentially actuating valves in the first sub-set based on the sub-phase offset such that at least one valve in the first sub-set is actuated out of phase from a preceding valve in the first sub-set by the sub-phase offset. The method further includes sequentially actuating valves in the second sub-set based on the phase offset and the sub-phase offset such that (i) at least one valve in the second sub-set is actuated out of phase from an adjacent valve in the first sub-set by the phase offset; and (ii) the at least one valve in the second sub-set is actuated out of phase from a preceding valve in the second sub-set by the sub-phase offset.

In another aspect, a fluid dispensing apparatus includes a plurality of electrically-actuated valves and a distribution conduit connected to a fluid supply. Each valve is connected to the distribution conduit and configured to regulate fluid flow out of the distribution conduit. The plurality of valves includes a plurality of valve sub-sets including a first sub-set and a second sub-set. The fluid dispensing apparatus also includes a controller communicatively connected to the plurality of valves. The controller is configured to determine a phase offset to separate actuation of the plurality of valve sub-sets into phases, and determine a sub-phase offset to separate actuation of valves within each of the plurality of valve sub-sets. The controller is also configured to sequentially actuate valves in the first sub-set based on the sub-phase offset such that actuation of at least one valve in the first sub-set is out of phase from actuation of a preceding valve in the first sub-set by the sub-phase offset. The controller is further configured to sequentially actuate valves in the second sub-set based on the phase offset and the sub-phase offset such that (i) at least one valve in the second sub-set is actuated out of phase from a preceding valve in the first sub-set by the phase offset; and (ii) at least one valve in the second sub-set is actuated out of phase from a preceding valve in the second sub-set by the sub-phase offset.

In another aspect a method of dispensing fluid from a fluid dispensing apparatus including a plurality of electrically-actuated valves includes supplying fluid to a distribution conduit of the fluid dispensing apparatus. The valves are connected to the distribution conduit and are configured to regulate fluid flow out of the distribution conduit. The plurality of valves includes a plurality of valve sets including a first set and a second set, and each of the first and second sets includes a plurality of valve sub-sets. The method further includes determining a phase offset to separate actuation of the plurality of valve sets into phases, and determining a sub-phase offset to separate actuation of valve sub-sets within each of the plurality of valve sets. The method further includes sequentially actuating valve sub-sets in the first set based on the sub-phase offset such that each valve sub-set in the first set is actuated out of phase from a preceding valve sub-set in the first set by the sub-phase offset. The method further includes sequentially actuating valve sub-sets in the second set based on the phase offset and the sub-phase offset such that (i) each valve sub-set in the second set is actuated out of phase from a preceding valve sub-set in the first set by the phase offset; and (ii) each valve sub-set in the second set is actuated out of phase from a preceding valve sub-set in the second set by the sub-phase offset.

In yet another aspect, a drive circuit for controlling a solenoid valve having a solenoid coil includes a first semiconductor device controlled by a pulse-width modulated (PWM) gate signal to energize the solenoid coil, and a flyback circuit coupled in parallel to the solenoid coil. The flyback circuit is configured to maintain current through the solenoid coil above a first threshold when the first semiconductor device is controlled by the PWM gate signal to open.

In yet another aspect, a method for controlling a solenoid valve having a solenoid coil includes coupling a first semiconductor device to the solenoid coil, coupling a flyback circuit in parallel to the solenoid coil, and providing a pulse-width modulated (PWM) gate signal to the first semiconductor device to open and close the first semiconductor device. The method further includes enabling the flyback circuit to maintain current through the solenoid coil above a first threshold when the first semiconductor device is controlled by the PWM gate signal to open.

In yet another aspect, a solenoid valve includes a solenoid coil, a poppet configured to translate therein, and a drive circuit. The drive circuit includes a first semiconductor device controlled by a pulse-width modulated (PWM) gate signal to energize the solenoid coil, and a flyback circuit coupled in parallel to the solenoid coil. The flyback circuit is configured to maintain current through the solenoid coil above a first threshold when the first semiconductor device is controlled by the PWM gate signal to open.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Figure 1:
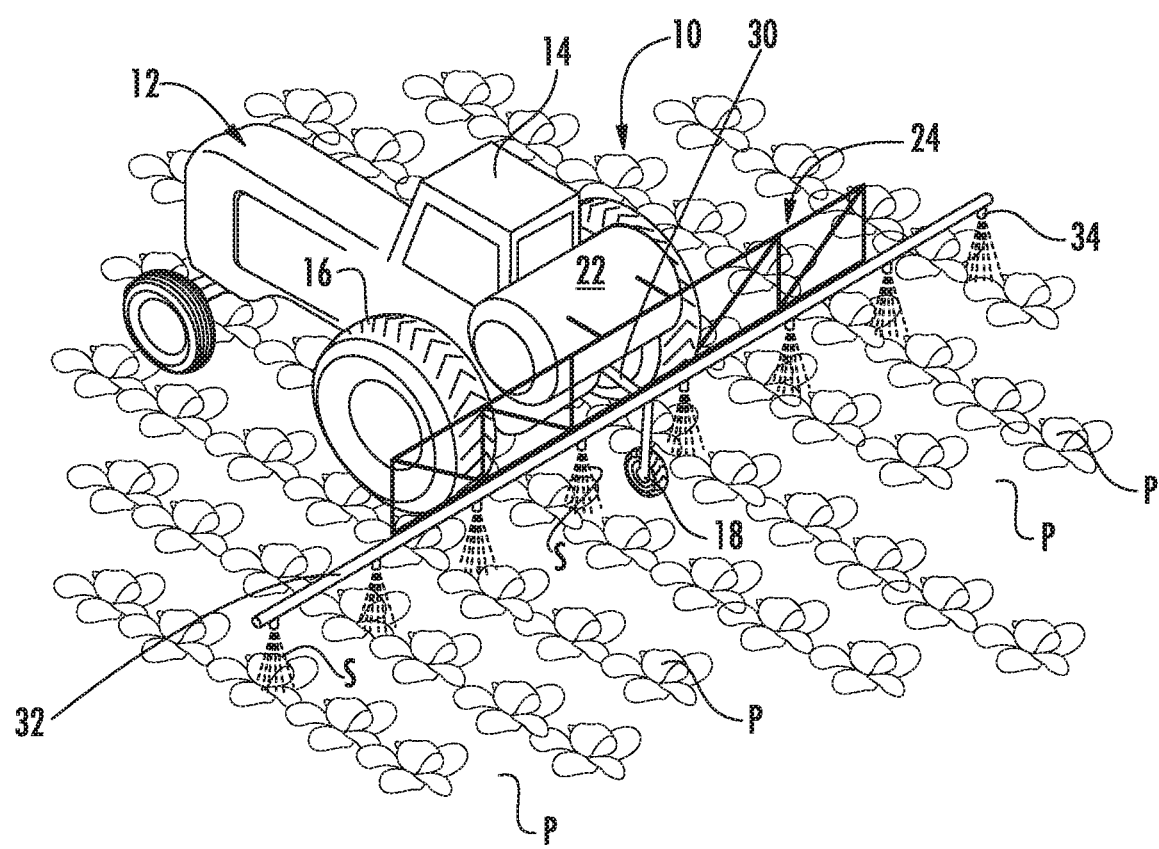
FIG. 1 is a perspective view of an example agricultural fluid dispensing apparatus.

Referring now to the figures, FIG. 1 is a perspective view of an example fluid dispensing apparatus, indicated generally at 10, operatively connected to a work vehicle 12. As shown, work vehicle 12 includes a cab 14 and a plurality of wheels 16. Work vehicle 12 may, in certain embodiments, be an agricultural tractor having any suitable configuration. However, it should be appreciated that in other embodiments, any other suitable aero or ground vehicle or means may be provided for moving fluid dispensing apparatus 10. For example, in other embodiments, work vehicle 12 may not include a cab, and instead may have any suitable operator station. Further, in some embodiments, work vehicle 12 and/or fluid dispensing apparatus 10 may include a global positioning system (e.g., a GPS receiver) for automated control of work vehicle 12 and/or fluid dispensing apparatus 10. In some embodiments, the global positioning system is used to monitor a travel speed of vehicle 12 and/or fluid dispensing apparatus 10, and/or to monitor a position of work vehicle 12 and/or fluid dispensing apparatus 10.

In the example embodiment, fluid dispensing apparatus 10 is configured to travel along a section of ground with a crop, produce, product or the like (generally, P). Fluid dispensing apparatus 10 includes at least one distribution conduit wheel 18, a tank or reservoir 22, and a spray boom 24. Spray boom 24 includes a plurality of nozzle assemblies 34 attached thereto and in fluid communication with tank 22. Tank 22 holds a product S, such as a liquid, a mixture of liquid and powder, or other product. Product S may be a quantity of water or an agrochemical such as a fertilizer or a pesticide, and may be sprayed and dispensed from nozzle assemblies 34 onto, for example, a crop or produce, or on and/or into ground P itself, as shown in FIG. 1 and described in greater detail below. It should be appreciated, however, that in other embodiments, fluid dispensing apparatus 10 may have any other suitable configuration. For example, in other embodiments, fluid dispensing apparatus 10 may not include distribution conduit wheel 18 or may alternatively include any suitable number of distribution conduit wheels 18. Further, while work vehicle 12 is depicted as towing fluid dispensing apparatus 10 in the example embodiment, it should be appreciated that, in other embodiments, work vehicle 12 may transport fluid dispensing apparatus 10 in any suitable manner that enables fluid dispensing apparatus 10 to function as described herein. For example, in some embodiments, work vehicle 12 may be an aerial vehicle and fluid dispensing apparatus 10 may be configured to spray fluid from a distance above the ground.

During operation of fluid dispensing apparatus 10, a quantity of product S held in tank 22 generally flows through one or more conduits to nozzle assemblies 34. More specifically, in the embodiment illustrated in FIG. 1, product S flows from tank 22, through a pipe 30 to distribution conduit 32, and from distribution conduit 32 to nozzle assemblies 34. It should be appreciated that terms "pipe" and "conduit," as used herein, may mean any type of conduit or tube made of any suitable material such as metal or plastic, and moreover that any other suitable ground application devices can be added to provide varying effects of placement of product S on top or below a soil surface of ground P, such as via pipes, knives, coulters, and the like.

In certain embodiments, nozzle assemblies 34 comprise direct acting solenoid valve equipped nozzles (see, e.g., FIGS. 2 and 3) and fluid dispensing apparatus 10 may include a pump, transducers to measure fluid pressure and fluid flow, sectional regulating valves, and a pressure and/or flow controller (not shown in FIG. 1). If included, the pump may be positioned downstream from tank 22, upstream from distribution conduit 32 and nozzle assemblies 34, and in operative communication with a controller or control system of fluid dispensing apparatus 10. The pump may be a pulse width modulation controlled pump configured to provide a desired amount of product flow through fluid dispensing apparatus 10. The pressure or flow controller may be configured to vary certain operating parameters of the pump, such as the pump's pulse frequency and/or duty cycle, to obtain a desired product flow rate through fluid dispensing apparatus 10. In alternative embodiments, fluid dispensing apparatus 10 may include one or more servo valves configured to provide a desired amount of product flow through fluid dispensing apparatus 10.

Referring still to FIG. 1, product S flows through nozzle assemblies 34 and may be applied to ground P in various ways. For example, product S may flow from nozzle assemblies 34 in a pulsed pattern. A pulsed pattern of fluid flow from nozzle assemblies 34 may allow for control of flow characteristics out of nozzle assemblies 34 and provide blended application pulses to prevent skips and provide increased coverage of the fluid on ground P. As fluid flows from nozzle assemblies 34 in a pulsed pattern, the instantaneous fluid flow within distribution conduit 32 may vary. As described in more detail below, a sub-phase offset may be utilized when nozzle assemblies 34 operate in a pulsed pattern to reduce or eliminate instantaneous pressure and flow fluctuations within distribution conduit 32. As a result, fluid dispensing apparatus 10 provides improved operating efficiency and accuracy of nozzle assemblies 34 operating in a pulsed pattern. In addition, fluid dispensing apparatus 10 reduces spikes in electrical power consumption and problems associated with variations in instantaneous fluid flow, such as water hammering, pressure fluctuations, and flowmeter inconsistencies. Further, as described in more detail below, current supplied to respective solenoid coils of the valves may be pulse-width modulated (PWM) at a relative high frequency to improve power efficiency and, moreover, may be combined with a controlled flyback circuit to further reduce average power consumption of the respective solenoid coils. In yet other embodiments of the systems and methods described herein, utilizing sub-phase offsets, high-frequency PWM energizing of the solenoid coils, and controlled flyback circuits may all be combined to achieve reduction in peak power consumption, decreased peak power consumption over time, and overall reduction in average power consumption by a given valve. Further, in such a combination, the system would exhibit improved operating efficiency of nozzle assemblies and mitigation of problems associated with varying instantaneous fluid flow, including water hammer, pressure fluctuations, and flowmeter inconsistencies.

For example, nozzle assemblies 34 may be grouped into a first sub-set of nozzle assemblies 34 and a second sub-set of nozzle assemblies 34. Nozzle assemblies 34 in the first sub-set and nozzle assemblies 34 in the second sub-set may be arranged in an alternating pattern along distribution conduit 32 such that each nozzle assembly 34 in the first sub-set is separated from adjacent nozzle assemblies 34 in the first sub-set by a nozzle assembly 34 in the second sub-set. Also, in such arrangements, each nozzle assembly 34 in the second sub-set is separated from adjacent nozzle assemblies 34 in the second sub-set by a nozzle assembly in the first sub-set. In alternative embodiments, nozzle assemblies 34 may be arranged in any manner that enables fluid dispensing apparatus 10 to operate as described herein. For example, in some embodiments, nozzle assemblies 34 in the first sub-set and the second sub-set may be grouped in sections along distribution conduit 32. In further embodiments, fluid dispensing apparatus 10 may include more than two sub-sets of nozzle assemblies 34.

Figure 2:
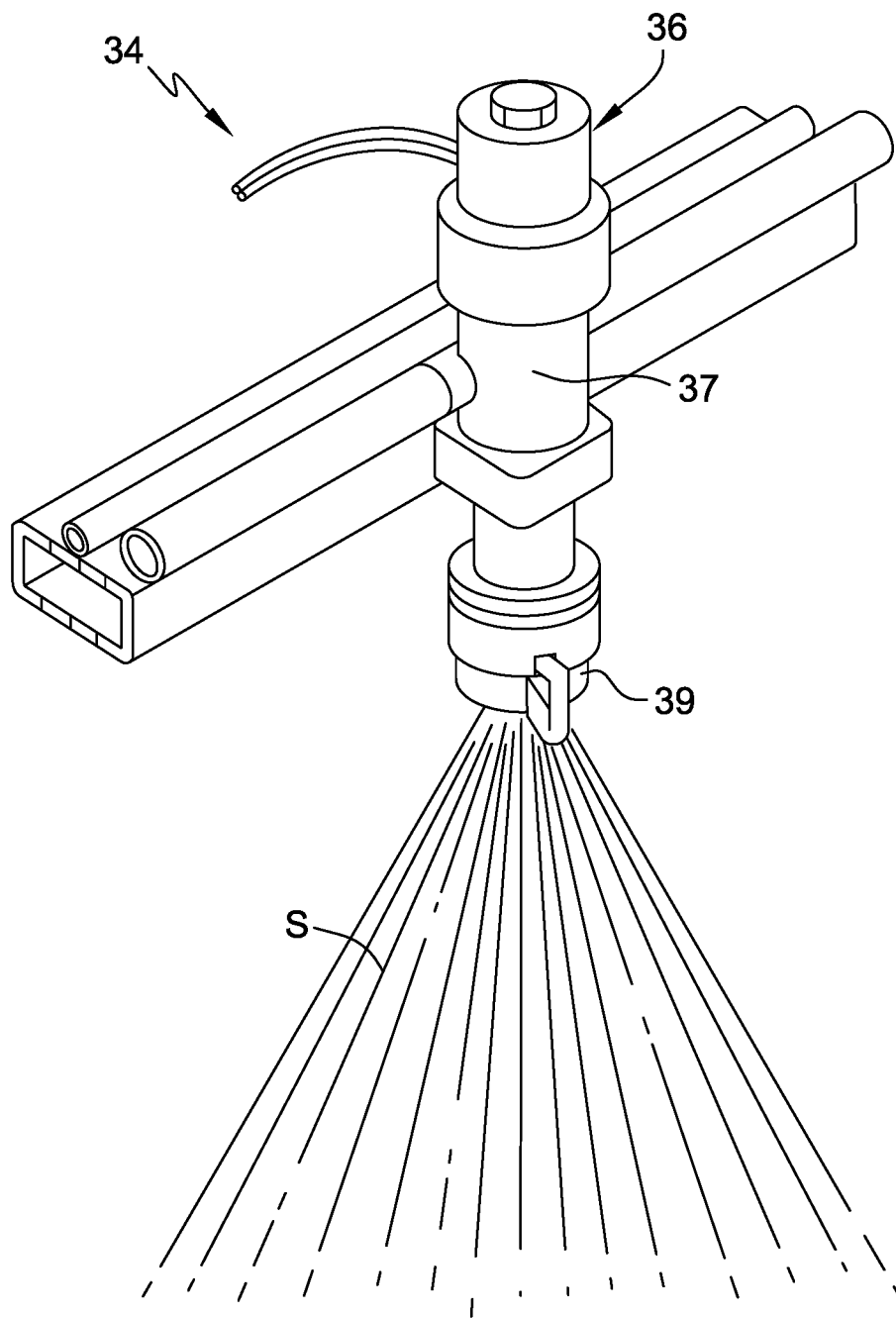
FIG. 2 is a perspective view of an example nozzle assembly suitable for use with the agricultural fluid dispensing apparatus of FIG. 1.

FIG. 2 is a perspective view of an example nozzle assembly 34 suitable for use with fluid dispensing apparatus 10 of FIG. 1. As shown in FIG. 2, nozzle assembly 34 generally includes a valve assembly 36, a nozzle body 37 configured to receive product S flowing through distribution conduit 32 and a nozzle 39 mounted to and/or formed integrally with nozzle body 37 for expelling product S from nozzle assembly 34 onto crops, product and/or ground P.

Figure 3:
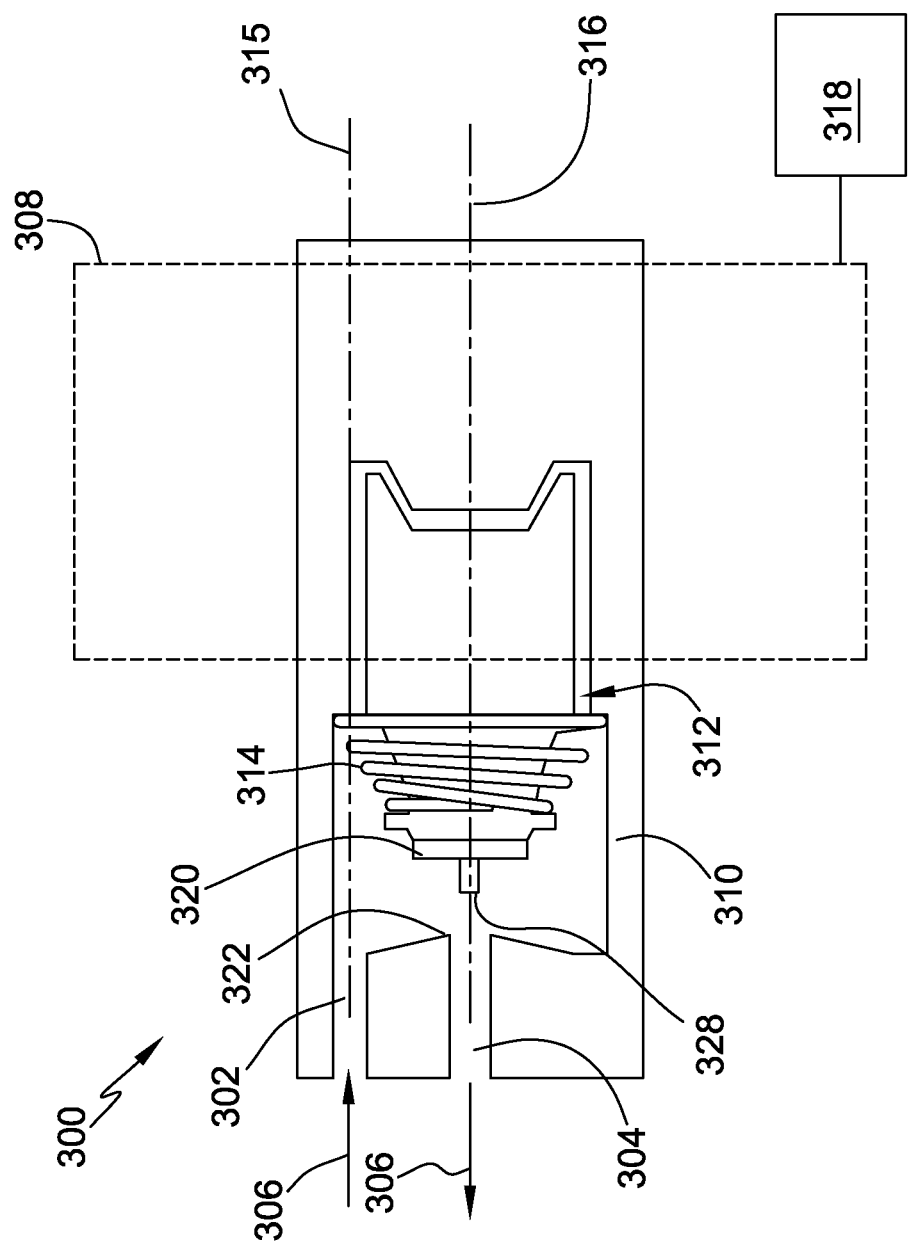
FIG. 3 is a sectional view of a portion of an example valve assembly suitable for use in the nozzle assembly shown in FIG. 2.

In some embodiments, valve assembly 36 is an electrically-actuated solenoid valve (see, e.g., FIG. 3). Moreover, in some embodiments, valve assembly 36 may be configured to be mounted to and/or integrated with nozzle 39 or nozzle body 37. In some embodiments, for example, valve assembly 36 may be mounted to the exterior of nozzle body 37, such as by being secured to nozzle body 37 through the nozzle's check valve port. Alternatively, valve assembly 36 may be integrated within a portion of nozzle body 37. In other embodiments, valve assembly 36 may be mounted to fluid dispensing apparatus 10 separately from nozzle body 37 and connected to nozzle body 37 by a conduit. In further embodiments, each valve assembly 36 may be coupled to a plurality of nozzles 39.

FIG. 3 is a simplified, cross-sectional view of an example electric solenoid valve 300 suitable for use in valve assembly 36 shown in FIG. 2. In general, valve 300 includes an inlet 302 and an outlet 304 for receiving and expelling fluid 306 from valve 300. Valve 300 also includes a solenoid coil 308 (shown in dashed lines) located on and/or around a guide 310. For instance, in one embodiment, solenoid coil 308 is wrapped around guide 310. Additionally, an actuator or poppet 312 is movably disposed within guide 310. In particular, poppet 312 may be configured to be linearly displaced within guide 310 relative to inlet 302 and/or outlet 304 of valve 300. Moreover, as shown, valve 300 includes a spring 314 coupled between guide 310 and poppet 312 for applying a force against poppet 312 in the direction of outlet 304. It should be appreciated that valve 300 may also include a valve body or other outer covering (not shown) disposed around coil 308.

As shown in the illustrated embodiment, valve 300 is configured as a counter flow valve. Thus, fluid 306 may enter valve 300 through inlet 302 along an axis 315 and exit valve 300 through outlet 304 along an axis 316. Poppet 312 may be configured to be linearly displaced within guide 310 along axis 316 such that fluid 306 may generally be directed out of valve 300 along axis 316. In other embodiments, valve 300 may have any configuration that enables fluid dispensing apparatus 10 to function as described. For example, in some embodiments, valve 300 is configured as an in-line valve. In other words, fluid may be configured to enter and exit valve 300 along a common axis.

In addition, solenoid coil 308 may be communicatively coupled to a controller 318 configured to regulate or control the current provided to coil 308. Controller 318 may include one or more modules or devices, one or more of which is enclosed within valve 300, enclosed within nozzle assembly 34, or located remote from nozzle assembly 34. Controller 318 may generally comprise any suitable computer and/or other processing unit, including any suitable combination of computers, processing units and/or the like that may be communicatively coupled to one another (e.g., controller 318 may form all or part of a controller network). Thus, controller 318 may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit (ASIC), a digital signal processor (DSP), a field programmable gate array (FPGA), and other programmable circuits. Additionally, the memory device(s) of controller 318 may generally comprise memory element(s) including, but not limited to, non-transitory computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 318 to perform various functions including, but not limited to, controlling the current supplied to solenoid coil 308, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Coil 308 may be configured to receive a controlled electric current or electric signal from controller 318 such that poppet 312 may move within guide 310 relative to outlet 304. For example, in one embodiment, controller 318 includes a square wave generator, a coil drive circuit, or any other suitable device that is configured to apply a regulated current to coil 308, thereby creating a magnetic field which biases (by attraction or repulsion) poppet 312 away from outlet 304. As a result, poppet 312 may be moved between a closed position and an opened position. One exemplary agricultural spray system may operate valves, such as valve 300, at about 10 Hertz, i.e., a given solenoid valve is opened every 100 milliseconds (ms) according to a valve-pulsing PWM signal. For certain operating pressures, the solenoid valve may take about 6 ms to open from the time coil 308 is energized, and about 4 ms to close from the time coil 308 is de-energized. For the remainder of the 100 ms period, the solenoid valve maintains the poppet in the opened or closed position, otherwise referred to as idle time. Typically, when a solenoid valve is activated, i.e., opened and held open, the solenoid coil is energized continuously and, conversely, when the solenoid valve is deactivated, i.e., closed and held close, the solenoid coil is de-energized. Alternatively, the frequency and duty cycle of the current conducted through the solenoid coil may be regulated to continuously conduct current through the solenoid coil while maintaining control of the desired valve-pulsing PWM signal.

In some embodiments, coil 308 may be driven with a complex pulsed voltage, or PWM waveform. A "pulse" may correspond to a duration (e.g., a 100 millisecond cycle) in which a low frequency duty cycle value sets the amount of on/off time. The "on" time may correspond to a "coil discharging (or charging) period" in which the drive voltage is turned off (or on) continuously and a "modulated period" in which the voltage is turned on and off at a high frequency (e.g., at a frequency of greater than 200 Hz). The duration of the coil discharging (or charging) period, also referred to as the "turn-on time", may be determined by the amount of time for the coil current to reach the desired value. The coil current may be continuously measured and compared to a threshold to trigger switching of the drive voltage to a modulated signal. Controller 318 may use a stored threshold and/or a threshold determined based on operating parameters of fluid dispensing apparatus 10 (shown in FIG. 1). For example, in some embodiments, the threshold may change during operation of fluid dispensing apparatus 10 based on information from a sensor that detects a position of poppet 312. In further embodiments, the threshold is determined based on the fluid pressure against poppet 312 and the current required to move poppet 312 to the open position and/or to move poppet 312 to the closed position.

In certain embodiments, controller 318 may control the supply of current to coil 308 to move poppet 312 to a throttling position intermediate the fully-opened and fully-closed position to control the instantaneous pressure drop across valve 300. Additionally, the attraction between coil 308 and poppet 312 may also allow poppet 312 to be pulsated or continuously cyclically repositioned, thereby providing for control of the average flow rate through valve 300.

In several embodiments, when valve 300 is being pulsed, the movement of poppet 312 may be cycled between the opened position and a closed, or sealed, position, wherein poppet 312 is sealed against outlet 304. Thus, as shown in FIG. 3, poppet 312 may also include one or more rubber disks or other suitable sealing members 320 that is configured to be pressed against outlet seat 322 of outlet 304 to create a leak-free seal when valve 300 is in the sealed position. A projection 328 extending from sealing member 320 may be received in outlet 304 when valve 300 is in the sealed position.

Figure 4:
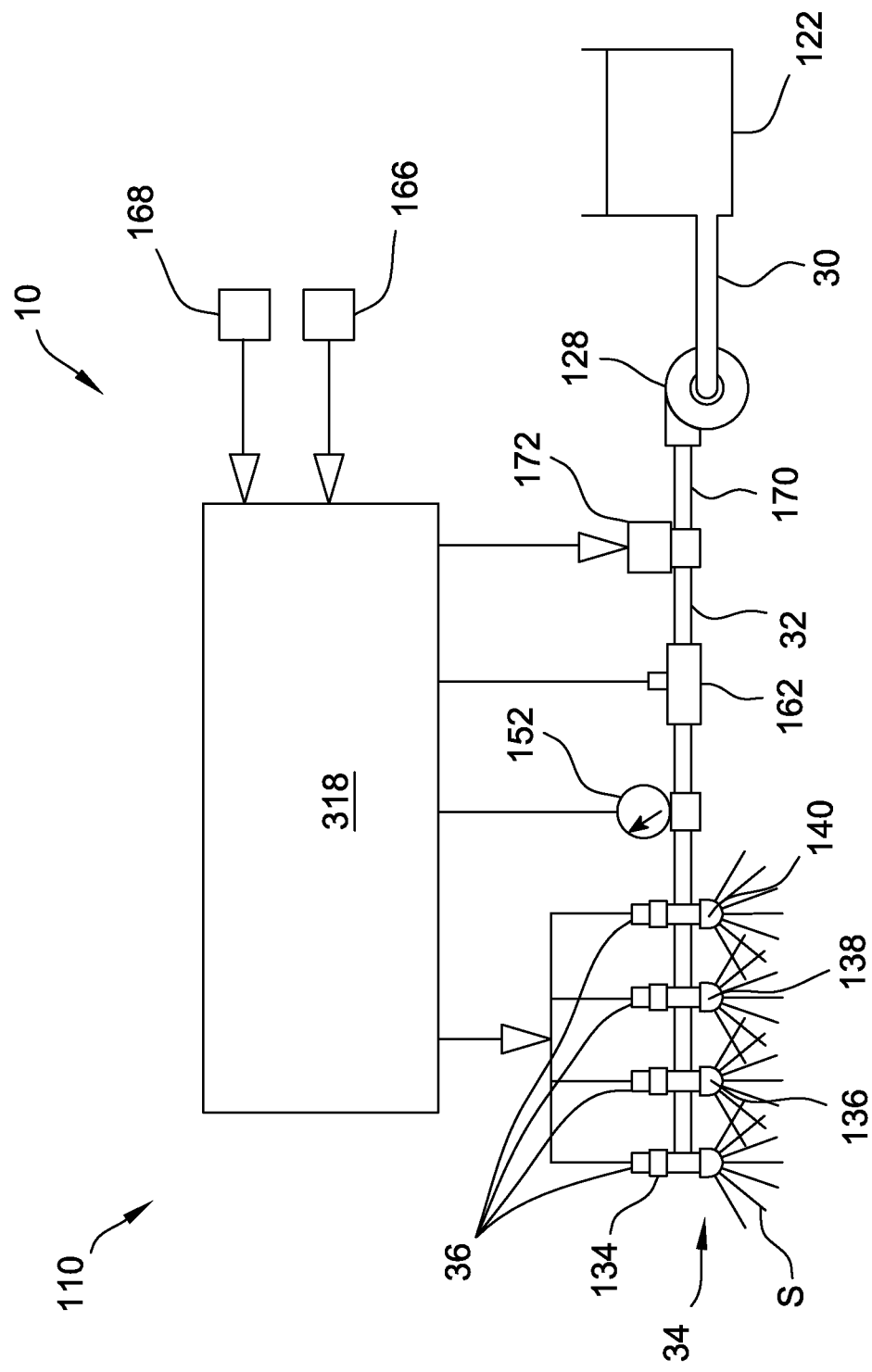
FIG. 4 is a schematic diagram of a control system suitable for use with the fluid dispensing apparatus of FIG. 1.

FIG. 4 is a schematic diagram of a control system 110 suitable for use with the fluid dispensing apparatus of FIG. 1. Control system 110 includes controller 318 communicatively connected to electrically-actuated nozzle assemblies 34. In the illustrated embodiment, fluid dispensing apparatus 10 includes a first nozzle assembly 134, a second nozzle assembly 136, a third nozzle assembly 138, and a fourth nozzle assembly 140 arranged sequentially along distribution conduit 32. First nozzle assembly 134 and third nozzle assembly 138 are included in a first sub-set of nozzle assemblies. Second nozzle assembly 136 and fourth nozzle assembly 140 are included in a second sub-set of nozzle assemblies. Each nozzle assembly 134, 136, 138, 140 includes a valve assembly, such as valve assembly 36. It should be understood that fluid dispensing apparatus 10 may include any type and number of nozzle assemblies that enables fluid dispensing apparatus 10 to function as described herein. For example, in some embodiments, fluid dispensing apparatus 10 may include three or more sub-sets of nozzle assemblies. In further embodiments, first nozzle assembly 134, second nozzle assembly 136, third nozzle assembly 138, and fourth nozzle assembly 140 are not arranged sequentially along distribution conduit 32. For example, in some embodiments, first nozzle assembly 134 may be positioned at a middle of distribution conduit 32. Second nozzle assembly 136, third nozzle assembly 138, and/or fourth nozzle assembly 140 may be positioned on either side of first nozzle assembly 134.

Controller 318 is communicatively connected to each nozzle assembly 134, 136, 138, 140 and is configured to cause actuation of valve assemblies 36 of respective nozzle assemblies 134, 136, 138, 140 in phases and sub-phases. For example, controller 318 is configured to determine a phase offset to separate actuation of the subsets of nozzle assemblies 134, 136, 138, 140 into phases. Specifically, the first sub-set of nozzle assemblies 134, 138 are actuated in a first phase and the second sub-set of nozzle assemblies 136, 140 are actuated in a second phase separated from actuation of the first phase by the phase offset. In some embodiments, controller 318 may include a plurality of distributed units connected to or integrated into individual valve assemblies 36. In such embodiments, controller 318 may include a centralized unit connected to each of the distributed units and/or valve assemblies, or may not include a centralized unit.

In addition, controller 318 is configured to determine a sub-phase offset to separate actuation of nozzle assemblies 134, 136, 138, 140 within each of the first sub-set and the second sub-set into sub-phases. For example, in the first phase, actuation of first nozzle assembly 134 is separated from actuation of third nozzle assembly 138 by the sub-phase offset. In the second phase, actuation of second nozzle assembly 136 is separated from actuation of fourth nozzle assembly 140 by the sub-phase offset. Accordingly, each nozzle assembly 134, 136, 138, 140 is actuated at a different time. As a result, fewer valves are opened and closed simultaneously within fluid dispensing apparatus 10 as compared to fluid dispensing apparatus using conventional valve phasing, and fluctuations in instantaneous fluid flow within distribution conduit 32 are reduced. In the exemplary embodiment, nozzle assemblies 134, 136, 138, 140 are actuated such that none of the valves are opened and closed simultaneously within fluid dispensing apparatus 10. In alternative embodiments, nozzle assemblies 134, 136, 138, 140 may grouped in sections along distribution conduit 32 and more than one nozzle assembly 134, 136, 138, 140 may be actuated simultaneously. For example, in some embodiments, each of the first and second valve sub-sets may include a plurality of groups or "gangs" of valves (also referred to as "ganged" valves), where all of the valves within a respective group of valves are actuated in unison or simultaneously (i.e., as a single unit). In such embodiments, the groups or "gangs" of valves within one of the first and second valve sub-sets may be actuated out-of-phase from one another by the sub-phase offset, instead of individual valves within a valve sub-set being actuated out-of-phase by the sub-phase offset. In such embodiments, the valve sub-sets may instead be referred to as "valve sets", and the groups or gangs of valves within the valve sets may be referred to as "valve sub-sets". The various valve actuation and phasing techniques described herein are equally applicable to such groups or "gangs" valves, and may be implemented with such embodiments accordingly.

Each valve assembly 36 of nozzle assemblies 134, 136, 138, 140 may be pulsed according to a duty cycle and a cycle time. Accordingly, controller 318 may determine the phase offset based on the cycle time and the number of nozzle assemblies 134, 136, 138, 140. For example, the phase offset may be determined by dividing the cycle time by the number of valve sub-sets. In addition, controller 318 may determine the sub-phase offset based on the number of the plurality of valves and a cycle time of the valves. Specifically, the sub-phase offset may be determined by dividing the cycle time by the number of the plurality of valves. In alternative embodiments, the phase offset and the sub-phase offset may be determined in any manner that enables fluid dispensing apparatus 10 to function as described herein. For example, in some embodiments, the sub-phase offset may be determined based on the number of active nozzle assemblies. In other words, in such embodiments, nozzle assemblies 134, 136, 138, 140 that are in a closed position and are not being actively pulsed may not be included in the calculation for determining the sub-phase offset. In addition, in some embodiments, controller 318 may determine the sub-phase offset based on characteristics of fluid flow within distribution conduit 32 such as fluid pressure. In further embodiments, controller 318 may determine the sub-phase offset based on a cycle time of valve assemblies 36, the number of valve assemblies 36, the configuration of piping connected to valve assemblies 36, and/or a duty cycle of valve assemblies 36. For example, in some embodiments, one or more of valve assemblies 36 may be pulsed at different duty cycles. For example, each valve assembly 36 may be pulsed at a different duty cycle to compensate for varying speeds along the distribution conduit when fluid dispensing apparatus 10 is being turned. In such embodiments, the phase offset and/or sub-phase offset may be determined based on the duty cycle of each valve assembly 36, the number of valves assemblies 36, and/or the cycle time of each valve assembly 36. In some embodiments, controller 318 may determine and/or change the phase offset and/or the sub-phase offset at any time during operation of fluid dispensing apparatus 10.

In some embodiments, the order of actuation of the nozzle assemblies 134, 136, 138, 140 is determined based on the position of the respective nozzle assemblies 134, 136, 138, 140 along distribution conduit 32. In alternative embodiments, the valve assemblies 36 may be actuated in any phases and/or sub-phases that enable the fluid dispensing apparatus 10 to operate as described herein. For example, the number of phases, the number of sub-phases, and/or the actuation frequency (number of actuations per cycle time) may be determined at least in part based on the intended use (e.g., ground sprayer, aerial sprayer, anhydrous fertilizer dispenser) of fluid dispensing apparatus 10.

In some embodiments, each nozzle assembly 134, 136, 138, 140 or each group of ganged nozzle assemblies 134, 136, 138, 140 is included in a separate or unique phase, and actuation of individual nozzle assemblies 134, 136, 138, 140 or groups of ganged nozzle assemblies 134, 136, 138, 140 are separated by the phase-offset. In other words, a unique phase may be determined for each nozzle assembly or valve (or each group of ganged valves or nozzle assemblies) within the fluid dispensing apparatus 10.

During operation of fluid dispensing apparatus 10, product S flows from a centrifugal pump 128 to a flow regulating valve 172 via a pressure pipe 170. The flow regulated product S flows to a flow meter 162, to a pressure sensor 152, and to nozzle assemblies 134, 136, 138, 140 via distribution conduit 32. In some embodiments, controller 318 may receive target rate information from a rate input device 168 and travel speed from a speed input device 166. Controller 318 sequentially actuates valve assemblies 36 of nozzle assemblies 134, 138 in the first sub-set based on the sub-phase offset such that actuation of each nozzle assembly 134, 138 in the first sub-set is out of phase from actuation of each preceding nozzle assembly 134, 138 in the first sub-set by the sub-phase offset. Controller 318 sequentially actuates valve assemblies 36 of nozzle assemblies 136, 140 in the second sub-set based on the phase offset and the sub-phase offset such that (i) each nozzle assembly 136, 140 in the second sub-set is actuated out of phase from an adjacent nozzle assembly 134, 138 in the first sub-set by the phase offset; and (ii) each nozzle assembly 136, 140 in the second sub-set is actuated out of phase from each preceding nozzle assembly 136, 140 in the second sub-set by the sub-phase offset. During the phased pulsing, nozzle assemblies 134, 136, 138, 140 dispense fluid from fluid dispensing apparatus 10. Although valves or nozzle assemblies in the second sub-set are described as being actuated out-of-phase from an adjacent valve or nozzle assembly in the first sub-set by the phase offset, it should be understood that, in certain embodiments, valves or nozzle assemblies in the second sub-set may be actuated out-of-phase from a preceding, non-adjacent valve in the first sub-set by the phase offset.

In some embodiments, controller 318 may actuate multiple nozzle assemblies 34 simultaneously, i.e., the nozzle assemblies 34 may be ganged. For example, at least some nozzle assemblies 34 in the first subset and/or the second subset may be ganged such that at least one group of nozzle assemblies 34 in the first sub-set and/or the second sub-set are actuated together. Accordingly, controller 318 may sequentially actuate groups of valve assemblies 36 of nozzle assemblies 136, 140 in the second sub-set based on the phase offset and the sub-phase offset such that (i) each group of nozzle assemblies 136, 140 in the second sub-set is actuated out of phase from an adjacent or preceding group of nozzle assemblies 134, 138 in the first sub-set by the phase offset; and (ii) each group of nozzle assemblies 136, 140 in the second sub-set is actuated out of phase from each preceding group of nozzle assemblies 136, 140 in the second sub-set by the sub-phase offset.

Figure 5:
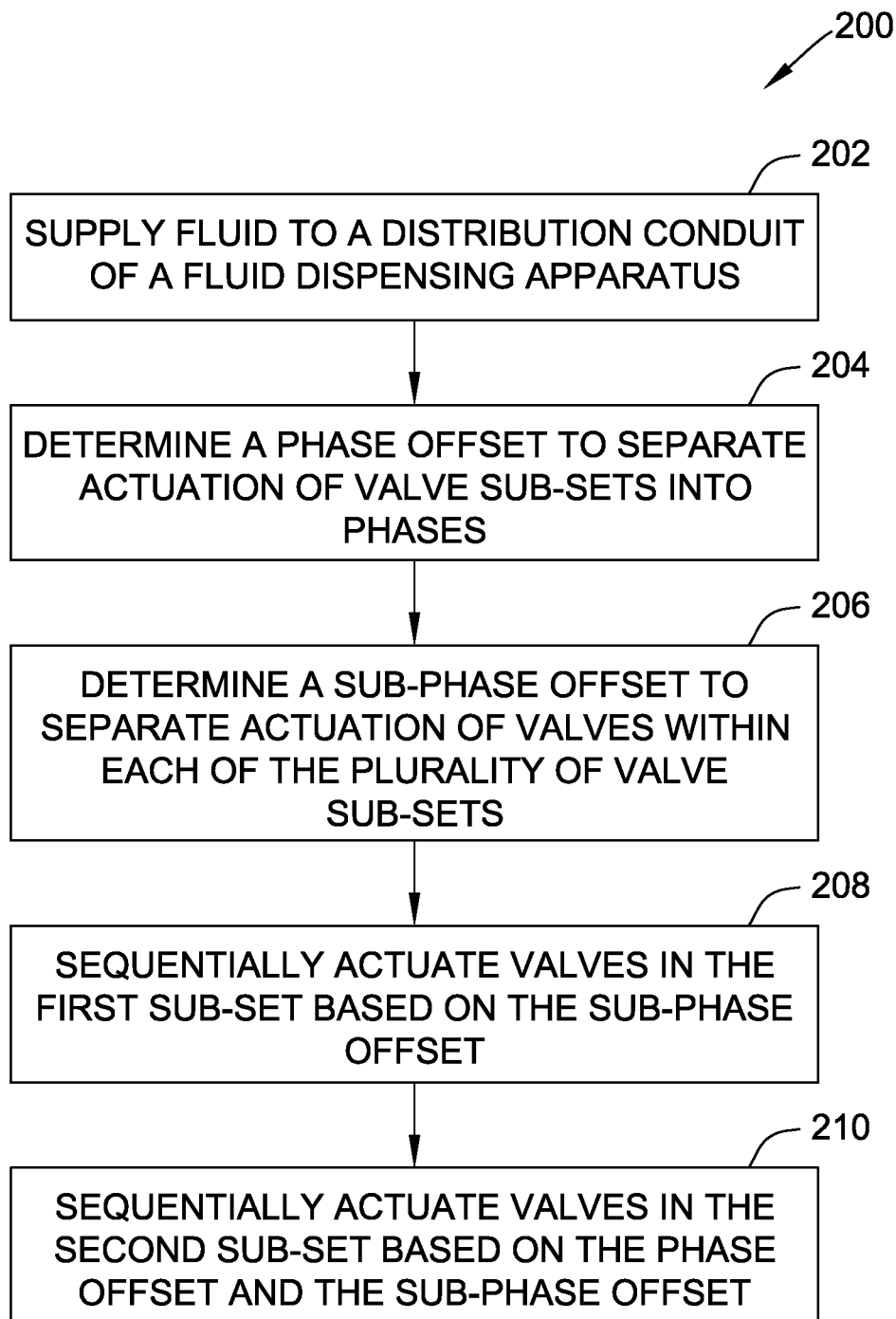
FIG. 5 is a flow chart of an example method of dispensing fluid using the fluid dispensing apparatus shown in FIG. 1.

FIG. 5 is a flow chart of an example method 200 of distributing fluid, such as product S, using fluid dispensing apparatus 10. In the example embodiment and with reference to FIGS. 4 and 5, method 200 includes supplying 202 fluid to distribution conduit 32 of fluid dispensing apparatus 10. In some embodiments, centrifugal pump 128 pumps product S from tank 122 and product S is delivered to distribution conduit 32. In alternative embodiments, fluid may be supplied to distribution conduit 32 in any manner that enables fluid dispensing apparatus 10 to operate as described herein.

In addition, method 200 includes determining 204 a phase offset to separate actuation of the plurality of valve sub-sets into phases and determining 206 a sub-phase offset to separate actuation of valve assemblies 36 within each of the plurality of valve sub-sets. In some embodiments, controller 318 determines the phase offset based on the number of sub-sets and the cycle time of valves. Specifically, determining 204 the phase offset may include dividing the cycle time by the number of valve sub-sets in the plurality of valve sub-sets. In addition, in some embodiments, controller 318 determines the sub-phase offset based on the number of valve assemblies 36 and a cycle time of valve assemblies 36. Specifically, determining 206 the sub-phase offset may include dividing the cycle time of the valves by the number of the plurality of valves. In alternative embodiments, the phase offset and/or the sub-phase offset may be determined in any manner that enables fluid dispensing apparatus 10 to function as described herein. In some embodiments, the phase offset and/or the sub-phase offset are at least partially determined based on user inputs.

In some embodiments, method 200 may include determining a plurality of sub-phase offsets. For example, a first sub-phase offset may be determined to separate actuation of the valves within the first sub-set and a second sub-phase offset may be determined to separate actuation of the valves within the second sub-set. In further embodiments, the second sub-phase offset is equal to the first sub-phase offset. In addition, in some embodiments, the first sub-phase offset and/or the second sub-phase offset is varied during actuation of valve assemblies 36.

Also, method 200 includes sequentially actuating 208 valve assemblies 36 in the first sub-set based on the sub-phase offset. Accordingly, each valve assembly 36 in the first sub-set is actuated out of phase from each preceding valve assembly 36 in the first sub-set by the sub-phase offset. Method 200 further includes sequentially actuating 210 valve assemblies 36 in the second sub-set based on the phase offset and the sub-phase offset. As a result, each valve assembly 36 in the second sub-set is actuated out of phase from an adjacent or preceding valve assembly 36 in the first sub-set by the phase offset. In addition, each valve assembly 36 in the second sub-set is actuated out of phase from each preceding valve assembly 36 in the second sub-set by the sub-phase offset. Actuation of valve assemblies 36 may include pulsing each valve assembly 36 according to a duty cycle and a cycle time. In alternative embodiments, valve assemblies 36 may be actuated in any manner that enables fluid dispensing apparatus 10 to operate as described.

Actuation of valve assemblies 36 results in fluid, such as product S, being dispensed from nozzle assemblies 134, 136, 138, 140. The phased actuation of valve assemblies 36 increases the accuracy and operating efficiency of fluid dispensing apparatus 10. For example, the phase offset provides a more consistent application of product S and the sub-phase offset reduces variations in instantaneous flow rate in distribution conduit 32 and distributes the instantaneous power draw on the electrical system of fluid dispensing apparatus 10.

Figure 6:
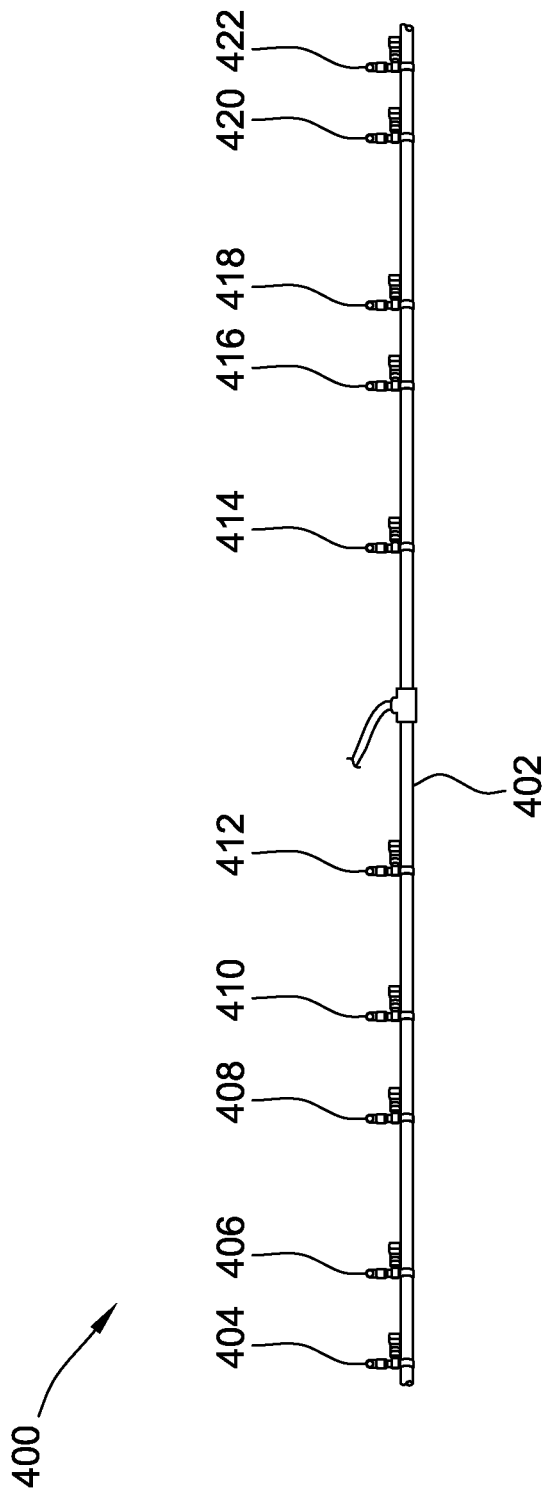
FIG. 6 is front view of a portion of a fluid dispensing apparatus including a distribution conduit and valve assemblies.

FIG. 6 is a front view of a portion of a fluid dispensing apparatus 400 including a fluid distribution conduit 402 and valves 404, 406, 408, 410, 412, 414, 416, 418, 420, 422. Fluid dispensing apparatus 400 may be used, for example, in combination with or as part of fluid dispensing apparatus 10 (e.g., as spray boom 24). Fluid dispensing apparatus 400 includes a first valve 404, a second valve 406, a third valve 408, a fourth valve 410, a fifth valve 412, a sixth valve 414, a seventh valve 416, an eighth valve 418, a ninth valve 420, and a tenth valve 422. Each valve 404, 406, 408, 410, 412, 414, 416, 418, 420, 422 is positionable between a first, open position, in which fluid is allowed to flow through the valve, and a second, closed position, in which fluid flow through the valve is restricted. Each valve 404, 406, 408, 410, 412, 414, 416, 418, 420, 422 may move between the first position and the second position when the valve is actuated. The valves 404, 406, 408, 410, 412, 414, 416, 418, 420, 422 are separated into a first subset including five valves and a second subset including five valves. Specifically, the first subset includes first valve 404, third valve 408, fifth valve 412, seventh valve 416, and ninth valve 420, and the second subset includes second valve 406, fourth valve 410, sixth valve 414, eighth valve 418, and tenth valve 422.

Figure 7:
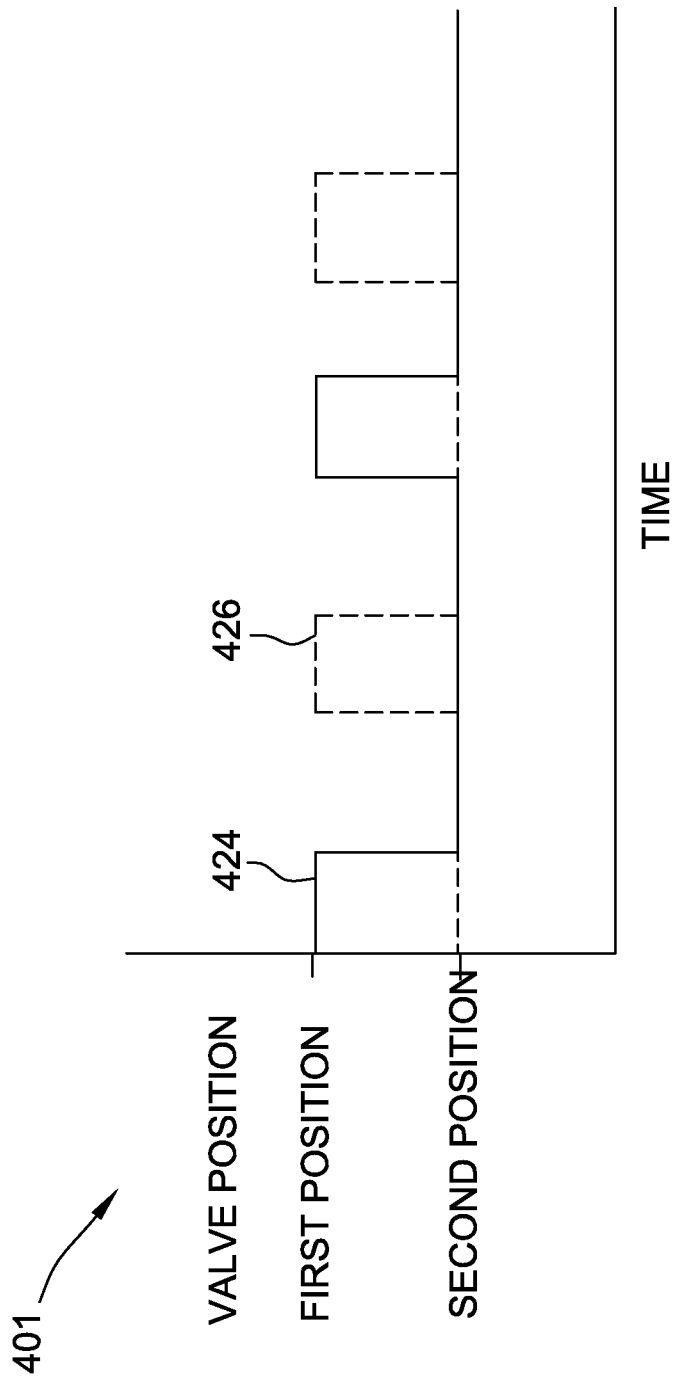
FIG. 7 is a graph showing valve position versus time for a fluid dispensing apparatus including a conventional phase offset.

FIG. 7 is a graph 401 of positions of valves 404, 406, 408, 410, 412, 414, 416, 418, 420, 422 versus time for fluid dispensing apparatus 400 (shown in FIG. 6) using a conventional phase offset. With reference to FIGS. 6 and 7, first valve 404, third valve 408, fifth valve 412, seventh valve 416, and ninth valve 420 are simultaneously actuated in the first subset (indicated by line 424) and moved between the first position and the second position. Accordingly, first valve 404, third valve 408, fifth valve 412, seventh valve 416, and ninth valve 420 are in the first position at the same time, and actuated into the second position at the same time. In addition, second valve 406, fourth valve 410, sixth valve 414, eighth valve 418, and tenth valve 422 are simultaneously actuated in the second subset (indicated by line 426) and moved between the first position and the second position. Accordingly, second valve 406, fourth valve 410, sixth valve 414, eighth valve 418, and tenth valve 422 are in the first position at the same time, and actuated into the second position at the same time. Moreover, because the duty cycle of the valves is less than 50%, valves 404, 406, 408, 410, 412, 414, 416, 418, 420, 422 are simultaneously in the second position for a duration of time.

Figure 8:
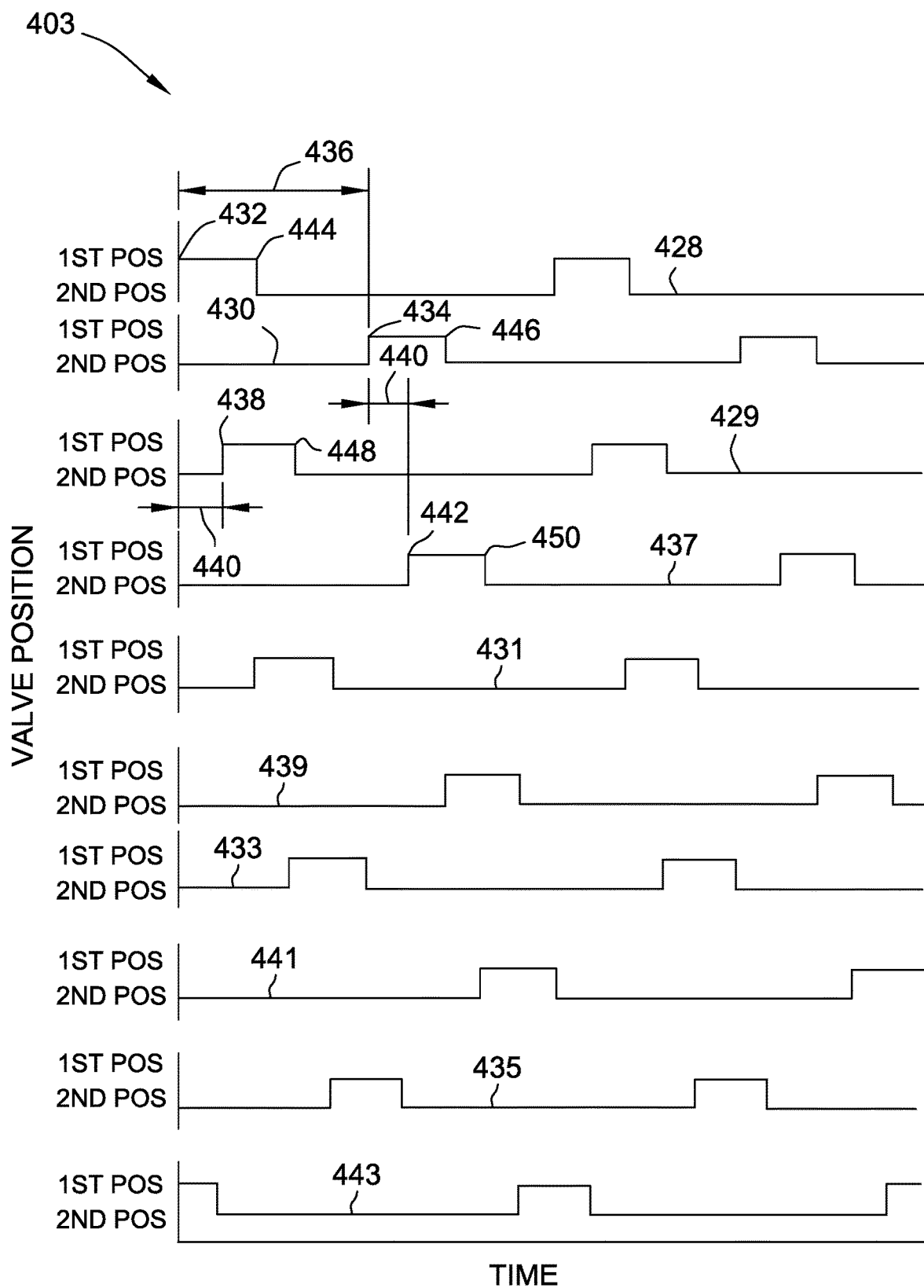
FIG. 8 is a graph showing valve position versus time for a fluid dispensing apparatus including a phase offset and a sub-phase offset.

FIG. 8 is a graph 403 of positions of valves 404, 406, 408, 410, 412, 414, 416, 418, 420, 422 versus time for fluid dispensing apparatus 400 (shown in FIG. 6) using a phase offset 436 and a sub-phase offset 440. With reference to FIGS. 6 and 8, first valve 404 (indicated by line 428), third valve 408 (indicated by line 429), fifth valve 412 (indicated by line 431), seventh valve 416 (indicated by line 433), and ninth valve 420 (indicated by line 435) are sequentially actuated out of phase from one another by the sub-phase offset 440 according to a duty cycle and period. Second valve 406 (indicated by line 430), fourth valve 410 (indicated by line 437), sixth valve 414 (indicated by line 439), eighth valve 418 (indicated by line 441), and tenth valve 422 (indicated by line 443) are sequentially actuated out of phase from one another by the sub-phase offset 440 according to the same duty cycle and period as the first subset, and actuated out-of-phase from a preceding valve in the first subset by the phase offset 436. Accordingly, each valve 404, 406, 408, 410, 412, 414, 416, 418, 420, 422 is actuated and held in the first position and the second position at a period of time that is different from other valves 404, 406, 408, 410, 412, 414, 416, 418, 420, 422 in the same subset and in the other subset(s).

For example, first valve 404 is actuated at a first time 432 to allow fluid to flow out of distribution conduit 402. Second valve 406 is actuated at a second time 434 to allow fluid to flow out of distribution conduit 402. Second time 434 is offset from first time 432 by the phase offset 436. Third valve 408 is actuated at a third time 438 to allow fluid to flow out of distribution conduit 402. Third time 438 is offset from first time 432 by the sub-phase offset 440. In addition, fourth valve 410 is actuated at a fourth time 442 to allow fluid to flow out of distribution conduit 402. Fourth time 442 is offset from the third time 438 by the phase offset 436, and from the second time 434 by sub-phase offset 440.

Also, first valve 404 is actuated at a fifth time 444 from the first position to the second position to restrict fluid flow out of distribution conduit 402. Second valve 406 is actuated at a sixth time 446 from the first position to the second position. Sixth time 446 is offset from fifth time 444 by phase offset 436. Third valve 408 is actuated at a seventh time 448 from the first position to the second position. Seventh time 448 is offset from fifth time 444 by sub-phase offset 440. Fourth valve 410 is actuated at an eighth time 450 from the first position to the second position. Eighth time 450 is offset from sixth time 446 by sub-phase offset 440 and offset from seventh time 448 by phase offset 436.

In the illustrated embodiment, sub-phase offset 440 is less than phase offset 436. For example, sub-phase offset 440 may be in a range of about 1 millisecond (ms) to about 10 ms and phase offset 436 may be in a range of about 2 ms to about 100 ms. In this embodiment, phase offset 436 is approximately 50 ms and sub-phase offset 440 is approximately 10 ms. Phase offset 436 may be determined by dividing the cycle time (100 ms) by the number of subsets (2). Sub-phase offset 440 may be determined by dividing the cycle time (100) by the number of valves (10). In alternative embodiments, phase offset 436 and sub-phase offset 440 may be determined (e.g., by controller 318) in any suitable manner that enables fluid dispensing apparatus 400 to function as described herein.

Figure 9:
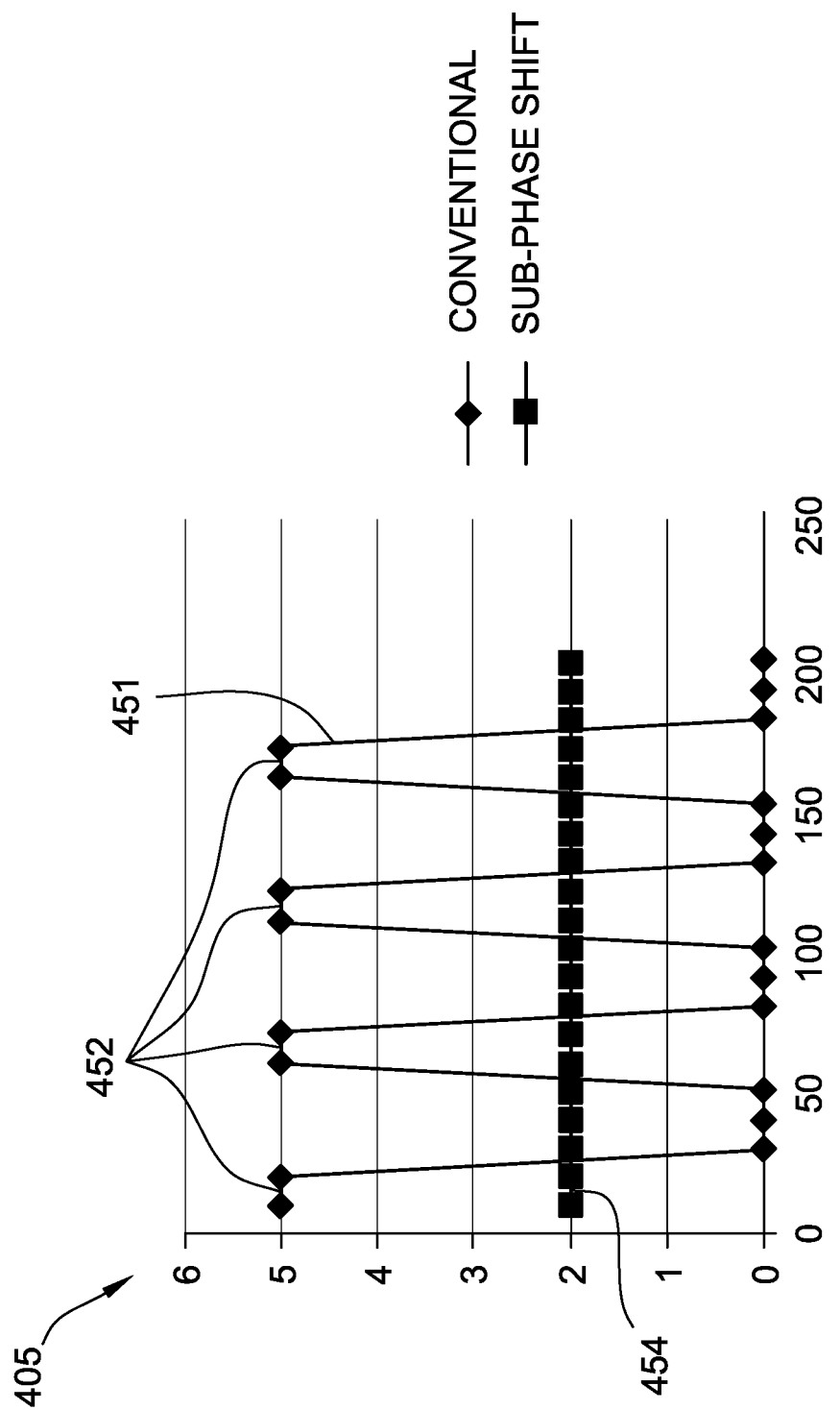
FIG. 9 is a plot showing the instantaneous number of open valves versus time for a fluid dispensing apparatus including a conventional phase offset and a fluid dispensing apparatus including a phase offset and a sub-phase offset.

FIG. 9 is a plot 405 showing the instantaneous number of open valves versus time during operation of fluid dispensing apparatus 400 (shown in FIG. 6) using (i) only phase offset 436 and (ii) phase offset 436 and sub-phase offset 440. In reference to FIG. 9, curve 451 represents the instantaneous number of open valves for fluid dispensing apparatus 400 including phase offset 436. Curve 451 includes peaks 452 which occur when the first subset of valves are open and when the second subset of valves are open. Between peaks 452, curve 451 indicates that all valves are in a closed position.

Curve 454 represents the instantaneous number of open valves of fluid dispensing apparatus 400 including phase offset 436 and sub-phase offset 440. Curve 454 has a slope of zero indicating that the number of valves open at a given time remains constant during operation of fluid dispensing apparatus 400 due to phase offset 436 and sub-phase offset 440. In other embodiments, curve 454 may have relatively slight variations, where the number of open valves increases or decreases. For example, the number of open valves may increase or decrease by a single valve based on the relationship between the sub-phase offset, the duty cycle, and the cycle time of the valve assemblies 36. In contrast, in two-phase systems, the number of open valves decreases and increases by half the total number valves, as shown by curve 451.

Figure 10:
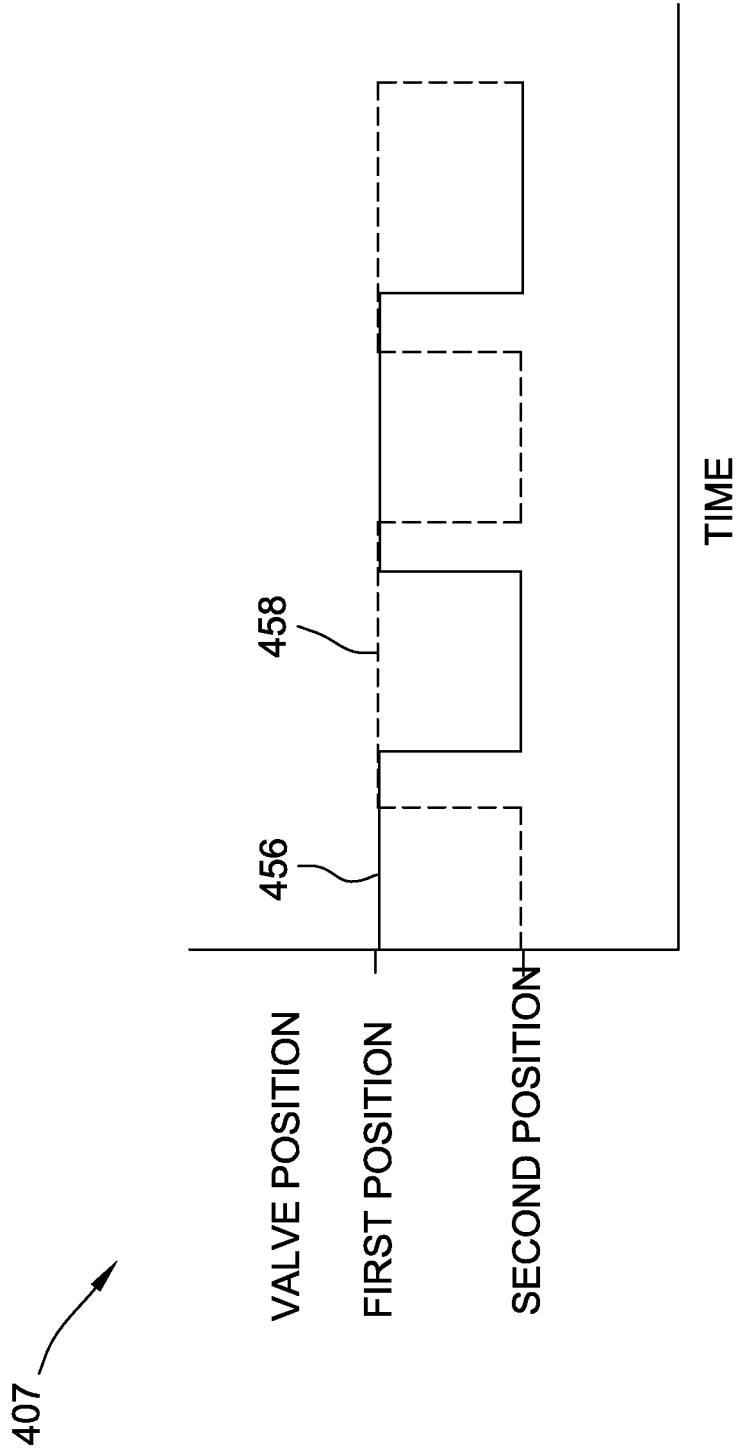
FIG. 10 is a graph showing valve position versus time for a fluid dispensing apparatus including a conventional phase offset for valves operated at sixty percent duty cycle.

FIG. 10 is a graph 407 of positions of valves 404, 406, 408, 410, 412, 414, 416, 418, 420, 422 versus time for fluid dispensing apparatus 400 (shown in FIG. 6) including phase offset 436 and each valve 404, 406, 408, 410, 412, 414, 416, 418, 420, 422 operating at sixty percent duty cycle. With reference to FIGS. 6 and 10, first valve 404, third valve 408, fifth valve 412, seventh valve 416, and ninth valve 420 are simultaneously actuated in the first subset (indicated by line 456) and moved between the first position and the second position. Accordingly, first valve 404, third valve 408, fifth valve 412, seventh valve 416, and ninth valve 420 are in the first position at the same time, and actuated in to the second position at the same time. In addition, second valve 406, fourth valve 410, sixth valve 414, eighth valve 418, and tenth valve 422 are simultaneously actuated in the second subset (indicated by line 458) and moved between the first position and the second position. Accordingly, second valve 406, fourth valve 410, sixth valve 414, eighth valve 418, and tenth valve 422 are in the first position at the same time, and actuated in to the second position at the same time. Moreover, because the duty cycle of the valves is greater than 50%, all of valves 404, 406, 408, 410, 412, 414, 416, 418, 420, 422 are in the first position for a duration of time.

Figure 11:
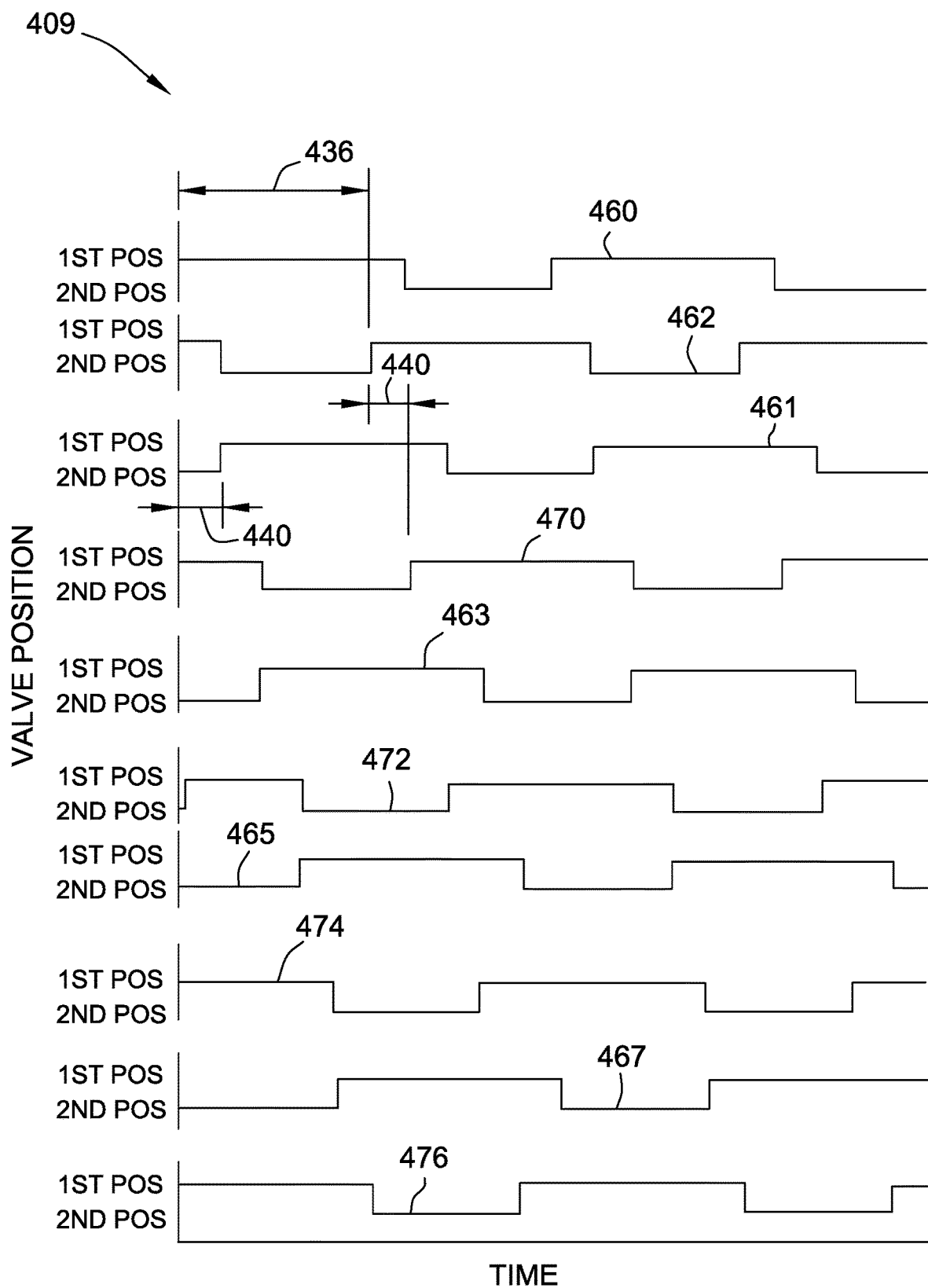
FIG. 11 is a graph showing valve actuation versus time for a fluid dispensing apparatus including a phase offset and a sub-phase offset for valves operated at sixty percent duty cycle.

FIG. 11 is a graph 409 of positions of valves 404, 406, 408, 410, 412, 414, 416, 418, 420, 422 versus time for fluid dispensing apparatus 400 (shown in FIG. 6) including a phase offset 436 and a sub-phase offset 440, and each valve 404, 406, 408, 410, 412, 414, 416, 418, 420, 422 operating at a sixty percent duty cycle. With reference to FIGS. 6 and 11, first valve 404 (indicated by line 460), third valve 408 (indicated by line 461), fifth valve 412 (indicated by line 463), seventh valve 416 (indicated by line 465), and ninth valve 420 (indicated by line 467) are sequentially actuated out of phase from one another by the sub-phase offset 440. Second valve 406 (indicated by line 462), fourth valve 410 (indicated by line 470), sixth valve 414 (indicated by line 472), eighth valve 418 (indicated by line 474), and tenth valve 422 (indicated by line 476) are sequentially actuated out of phase from one another by the sub-phase offset 440, and actuated out-of-phase from a preceding valve in the first subset by the phase offset 436. Accordingly, each valve 404, 406, 408, 410, 412, 414, 416, 418, 420, 422 is actuated and held in the first position and the second position at a period of time that is different from other valves 404, 406, 408, 410, 412, 414, 416, 418, 420, 422 in the same subset and in the other subset(s).

Figure 12:
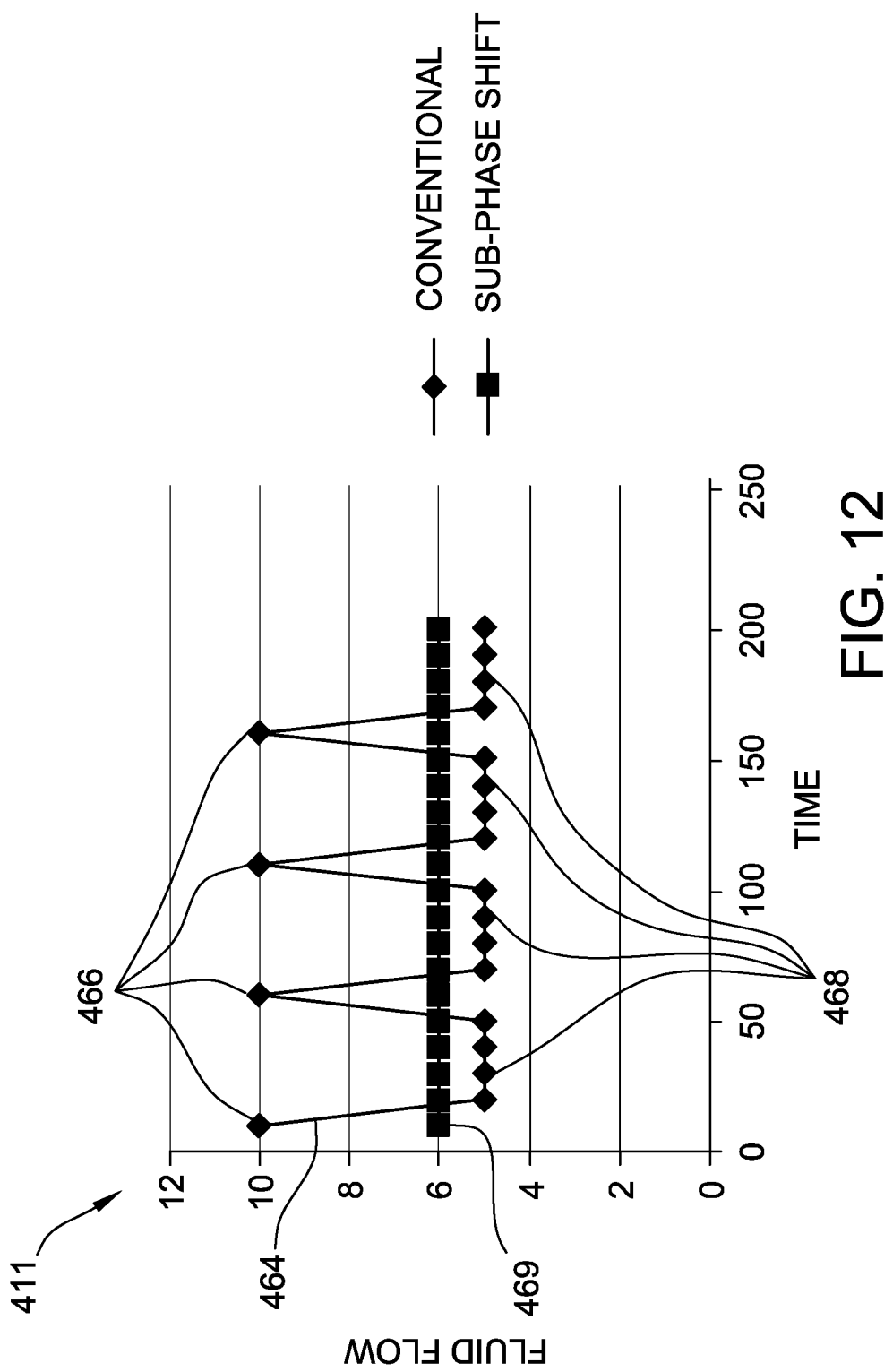
FIG. 12 is a plot showing the instantaneous number of open valves versus time for a fluid dispensing apparatus including a phase offset for valves operated at sixty percent duty cycle, and a fluid dispensing apparatus including a phase offset and a sub-phase offset for valves operated at sixty percent duty cycle.

FIG. 12 is a plot 411 showing the instantaneous number of open valves versus time for fluid dispensing apparatus 400 (shown in FIG. 6) using (i) only phase offset 436 and (ii) phase offset 436 and sub-phase offset 440, for valves operated at a 60% duty cycle. In reference to FIGS. 6 and 12, curve 464 represents the number of open valves for fluid dispensing apparatus 400 using only phase offset 436 and a sixty percent duty cycle. Curve 464 includes peaks 466, corresponding to a point in time when the first subset of valves and the second subset of valves are in the first, open position. In addition, curve 464 includes valleys 468 which correspond to a point in time when one of the first subset and the second subset of valves 404, 406, 408, 410, 412, 414, 416, 418, 420, 422 is in the first, open position, and the other of the first subset and the second subset of valves 404, 406, 408, 410, 412, 414, 416, 418, 420, 422 is in the second, closed position.

Plot 411 also includes a curve 469 representing the instantaneous number of open valves for fluid dispensing apparatus 400 using phase offset 436 and sub-phase offset 440, and sixty percent duty cycle. Curve 469 has a slope of zero indicating that the number of open valves is constant during operation of fluid dispensing apparatus 400 due to phase offset 436 and sub-phase offset 440. Thus, although each valve 404, 406, 408, 410, 412, 414, 416, 418, 420, 422 is being cyclically actuated between open and closed positions according to a duty cycle during operation of fluid dispensing apparatus 400, the overall number of valves that are open at a given time remains the same or varies by a single valve. Thus, utilizing a sub-phase offset avoids large discrepancies in the number of valves that are opened or closed at a given time, and thereby provides improved operating efficiency and accuracy. In particular, by maintaining a relatively constant number of opened valves during operation, large variations in instantaneous pressure and fluid flow are reduced or eliminated, and spikes in electrical power consumption are also reduced or eliminated.

Figure 13:
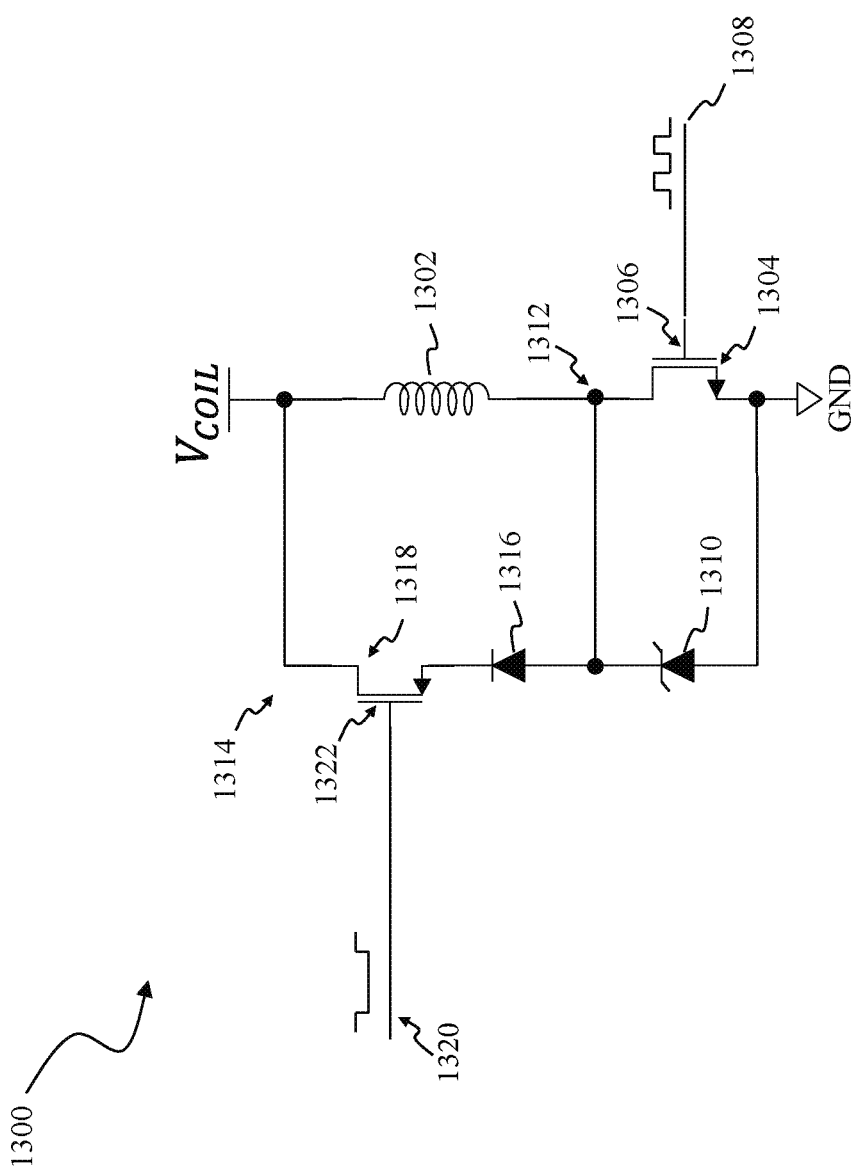
FIG. 13 is a schematic diagram of a drive circuit for use in driving solenoid valves, such as the valve assembly shown in FIG. 3.

Further reductions in peak power consumption and overall average power consumption can also be realized by utilizing specific drive circuits and driving techniques. For example, FIG. 13 is a schematic diagram of a drive circuit 1300 for use in driving solenoid valves, such as, for example, solenoid valve 300, shown in FIG. 3. Drive circuit 1300 may form all or part of controller 318, shown in FIG. 3 and FIG. 4. Generally, drive circuit 1300 is configured to generate a current signal, or waveform, for energizing a solenoid coil 1302 of the solenoid valve. Drive circuit 1300 includes a field-effect transistor (FET) 1304 configured to open and close the circuit for energizing solenoid coil 1302. More specifically, FET 1304 opens and closes a path to ground (GND) through which a coil current conducts from a voltage supply, $V_{coil}$, through solenoid coil 1302, and to GND through FET 1304. Generally, FET 1304 is controlled, i.e., open and closed, by applying a voltage to a gate 1306 of FET 1304. FET 1304 is controlled by a gate signal 1308 provided by a controller, such as controller 318, for example. In certain embodiments, gate signal 1308 is a simple logic-level signal that applies a high logic level to gate 1306 to make FET 1304 conduct the coil current when the solenoid valve should open. Likewise, in such an embodiment, gate signal 1308 applies a low logic level to gate 1306 to make FET 1304 open the circuit and de-energize solenoid coil 1302.

In other embodiments, gate signal 1308 is pulse-width modulated (PWM) with a certain duty cycle and at a certain frequency to supply a desired amount of current to solenoid coil 1302. For example, a 100% duty cycle gate signal 1308 may be applied to gate 1306 to transition the solenoid valve from a closed position to an opened position, i.e., to translate the poppet from the closed position to the opened position. A 0% duty cycle gate signal 1308 is applied to gate 1306 (or gate signal 1308 is removed entirely) to transition the solenoid valve from the opened position to the closed position. Further, gate signal 1308 is modulated to a high frequency and a low duty cycle when the solenoid valve is being held in the opened position after transitioning from the closed position. In certain embodiments, when the solenoid valve is being held in the closed position, gate signal 1308 may be modulated to a low frequency and low duty cycle to maintain a level of coil current above zero, but below the threshold at which the valve poppet would translate from the closed position to the opened position, thereby improving responsiveness of the valve to an "open" command.

Drive circuit 1300 includes a protection diode 1310 connected in parallel to FET 1304 to protect FET 1304 from large voltage spikes that would otherwise develop on the drain terminal of FET 1304, represented by a node 1312 in FIG. 13, when periodically switching the coil current. More specifically, when switching the coil current off, a (negative) back electromotive voltage, or "electromotive force" (EMF), develops at node 1312 that "opposes" the change in current in solenoid coil 1302, i.e., to decay to zero. Protection diode 1310 provides an alternative path to GND for the coil current dissipating from solenoid coil 1302, thereby preventing an excessive voltage buildup on node 1312. Protection diode 1310 may be, for example, a Zener diode having a high breakdown voltage of about 28 volts or, in other embodiments, about 40 volts. Protection diode 1310 should be selected to have a breakdown voltage sufficiently low to protect FET 1304 from a voltage that could saturate or damage FET 1304, while also being high enough to not conduct when FET 1304 is open. Further, the breakdown voltage of protection diode 1310 should be high enough to generate a sufficiently large reverse voltage at node 1312 to quickly dissipate energy stored in solenoid coil 1302 when translating the poppet to the closed position.

Drive circuit 1300 includes a flyback circuit 1314 that slows the decay of current through solenoid coil 1302 when switched off at a high frequency by FET 1304. By slowing the decay, flyback circuit 1314 enables the coil current to remain substantially constant, and above a threshold at which the valve would close, when switching FET 1304 at a high frequency, e.g., when the valve is being held in the opened position by a high frequency PWM gate signal 1308. Flyback circuit 1314 includes a diode 1316 that preferably has a low forward voltage, such as a silicon or germanium diode, or a Schottky diode. Generally, the speed at which solenoid coil 1302 discharges its stored energy is directly related to the voltage drop across it, which is further a function of the back EMF. Accordingly, the lower the forward voltage of diode 1316, the lower the voltage drop across solenoid coil 1302, and the slower energy is dissipated from solenoid coil 1302. Flyback circuit 1314 further includes a FET 1318 that enables and disables flyback circuit 1314 by closing and opening the "free-wheeling" path for the coil current to dissipate from node 1312 through diode 1316. FET 1318 is controlled by a gate signal 1320 applied to a gate 1322 of FET 1318. Gate signal 1320 is supplied by a controller, such as, for example, controller 318, or the controller that operates FET 1304 using gate signal 1308, described above. FET 1318 and gate signal 1320 enable flyback circuit 1314 when FET 1304 is operated with a high frequency PWM signal, such as when the valve is being held in an opened position. While enabled, flyback circuit 1314 and, more specifically, diode 1316 slow the decay of the coil current from solenoid coil 1302, further enabling the reduction of the duty cycle of current supplied to solenoid coil 1302, i.e., the duty cycle of gate signal 1308. Likewise, FET 1318 and gate signal 1320 disable flyback circuit 1314 when the coil current should dissipate quickly, such as when the valve is to be closed. When flyback circuit 1314 is disabled, protection diode 1310 directs the current to GND. Generally, flyback circuit 1314 may be enabled or disabled when transitioning the valve from the closed position to the opened position using a 100% duty cycle gate signal 1308, because solenoid coil 1302 is charging and FET 1304 provides a low-impedance path to GND.

Figure 14:
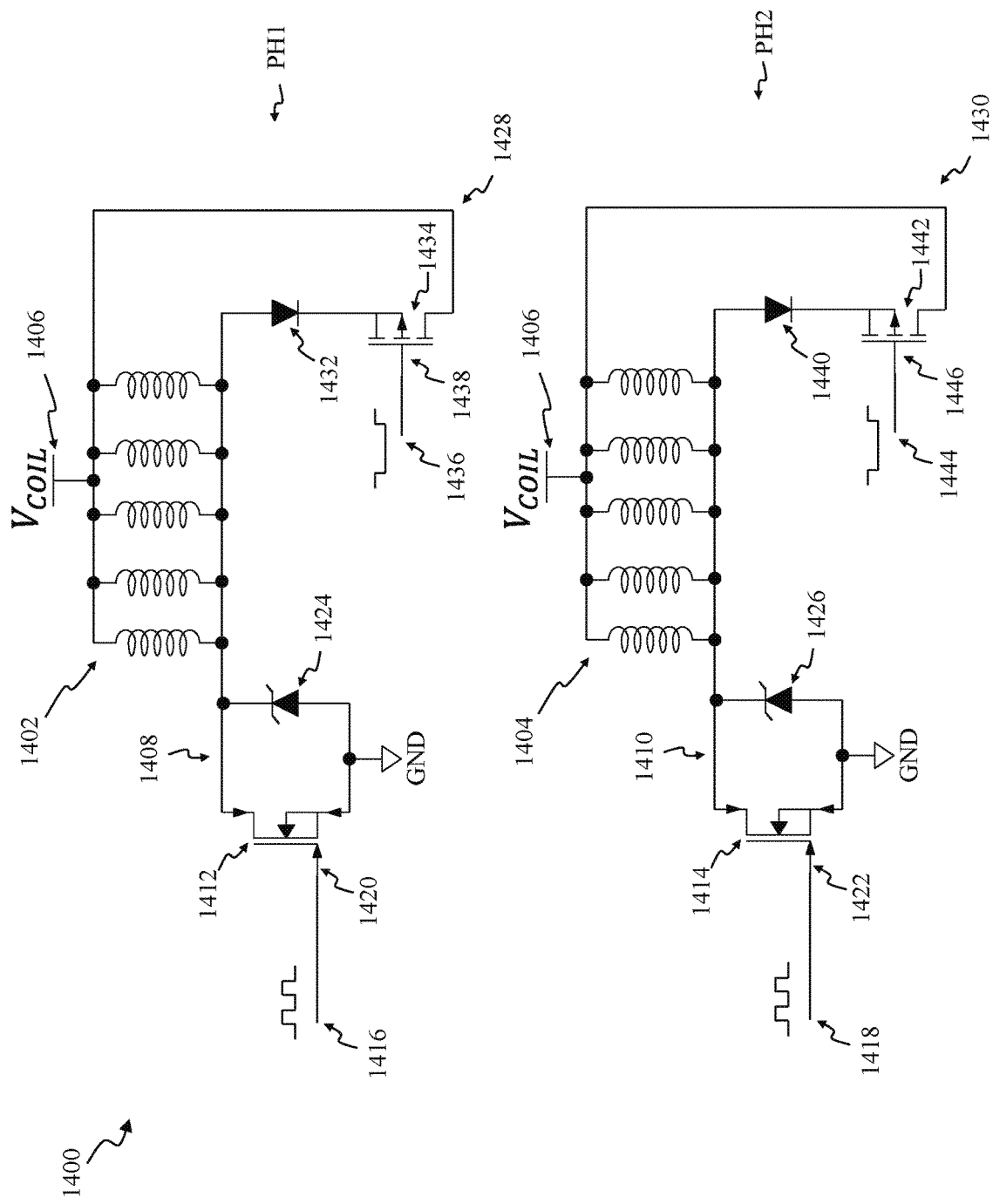
FIG. 14 is a schematic diagram of another drive circuit for use in driving multiple solenoid valves and, particularly, phased solenoid valves.

FIG. 14 is a schematic diagram of another drive circuit 1400 for use in driving multiple solenoid valves and, particularly, phased solenoid valves. Drive circuit 1400 is configured to operate two sets, or sub-sets, of valves out of phase from each other, which is to say the two sets of valves are opened and closed offset in time with respect to each other. The valves (for clarity, only the solenoid coils of the valves are shown in FIG. 14) and, more specifically, their respective solenoid coils 1402 and 1404 are supplied a coil voltage (Vcoil) from coil voltage supply 1406, and the coil currents are conducted through the solenoid coils 1402 and 1404 to respective ground paths 1408 and 1410 for a first phase (PH1) valve set and a second phase (PH2) valve set. Generally, when the PH1 ground path 1408 is closed, the PH1 solenoid coils 1402 conduct coil currents from coil voltage supply 1406 to GND and, likewise, when the PH2 ground path 1410 is closed, the PH2 solenoid coils 1404 conduct coil currents from coil voltage supply 1406 to GND.

The PH1 ground path 1408 and PH2 ground path 1410 are opened and closed by a FET 1412 and a FET 1414, respectively. In alternative embodiments, FET 1412 and FET 1414 may be coupled in series between solenoid coils 1402 and 1404 and coil voltage supply 1406. FET 1412 and FET 1414 may be controlled directly or by respective gate driver circuits (not shown) in response to a PH1 control signal 1416 and a PH2 control signal 1418, respectively. In the embodiment of FIG. 14, FET 1412 and FET 1414 are illustrated as being controlled directly by PH1 control signal 1416 and PH2 control signal 1418, respectively.

PH1 control signal 1416 is applied to a gate 1420 of FET 1412 to control, or gate, FET 1412. FET 1412 generally enables fast turn-on and is capable of sinking coil currents conducted by solenoid coils 1402. In alternative embodiments, where FET 1412 is coupled in series between solenoid coils 1402 and coil voltage supply 1406, FET 1412 sources coil currents conducted by solenoid coils 1402. FET 1412 may be a power metal-oxide semiconductor field-effect transistor (MOSFET), an insulated gate bipolar transistor (IGBT), or other solid state device suitable for switching the coil current. PH1 control signal 1416 may be provided, in certain embodiments, by controller 318 (shown in FIG. 3) or any other suitable controller or digital circuit.

PH2 control signal 1418 is applied to a gate 1422 of FET 1414 to control, or gate, FET 1414. FET 1414 generally enables fast turn-on and is capable of sinking coil currents conducted by solenoid coils 1404. In alternative embodiments, where FET 1414 is coupled in series between solenoid coils 1404 and coil voltage supply 1406, FET 1414 sources coil currents conducted by solenoid coils 1404. FET 1414 may be a power MOSFET, an IGBT, or other solid state device suitable for switching the coil current. PH2 control signal 1418 may be provided, in certain embodiments, by controller 318 (shown in FIG. 3) or any other suitable controller or digital circuit.

Drive circuit 1400 includes protection diodes 1424 and 1426 connected in parallel to FETs 1412 and 1414, respectively. Protection diodes 1424 and 1426 are similar in structure and function to protection diode 1310, shown in FIG. 13. More specifically, protection diode 1424 for example, protects FET 1412 from excessive voltage build up across the terminals of FET 1412 when FET 1412 is opened by dissipating current generated from the energy stored in the PH1 solenoid coils 1402. Protection diode 1426 for example, protects FET 1414 from excessive voltage build up across the terminals of FET 1414 when FET 1414 is opened by dissipating current generated from the energy stored in the PH1 solenoid coils 1404. Protection diodes 1424 and 1426 may include, for example, one or more Zener diodes having a breakdown voltage of about 28 volts or, in other embodiments, about 40 volts.

Drive circuit 1400 includes flyback circuits 1428 and 1430 connected in parallel to the PH1 and PH2 solenoid coils 1402 and 1404, respectively. Flyback circuits 1428 and 1430 are similar in structure and function to flyback circuit 1314, shown in FIG. 13. More specifically, flyback circuit 1428 for example, slows the dissipation of coil currents from the PH1 solenoid coils 1402 when FET 1412 is switched at a high frequency. Flyback circuit 1428 includes a diode 1432 coupled in series with a MOSFET 1434, and flyback circuit 1428 is coupled between coil voltage supply 1406 and the PH1 ground path 1408. When enabled, diode 1432 "free-wheels" the stored coil energy in the PH1 solenoid coils 1402, i.e., free-wheeling initiates immediately when FET 1412 is opened and continues for a limited duration after FET 1412 is opened. Diode 1432 is preferably a low forward voltage diode, such as a Schottky diode, a silicon diode, or a germanium diode. A lower forward voltage enables a slower dissipation of the coil current and, consequently, a more-steady coil current as FET 1412 is switched at a high frequency. In alternative embodiments, where FET 1414 is coupled in series between solenoid coils 1404 and coil voltage supply and FET 1414 sources coil currents, flyback circuit 1428 (and/or protection diodes 1424 and 1426) are modified based on the opposite direction of the "flyback current."

Flyback circuit 1428, in certain embodiments, may further include a gate driver circuit (not shown) for gating MOSFET 1434. Alternatively, as shown in FIG. 14, MOSFET 1434 is enabled and disabled directly by a flyback control signal 1436 applied at a gate 1438 of MOSFET 1434.

Flyback control signal 1436 may be supplied, in certain embodiments, by controller 318 or any other suitable controller or digital circuit. Generally, flyback control signal 1436 enables flyback circuit 1428 when the PH1 valve set and, more specifically, the PH1 solenoid coils 1402 are being supplied a high frequency PWM current signal by FET 1412, such as, for example, when the PH1 valve set is being held in the opened position. Further, flyback control signal 1436 disables flyback circuit 1428 when the coil currents in the PH1 solenoid coils 1402 should be dissipated quickly, such as, for example, when the PH1 valve set is transitioning from the opened position to the closed position.

Likewise, flyback circuit 1430 slows the dissipation of coil currents from the PH2 solenoid coils 1404 when FET 1414 is switched at a high frequency. Flyback circuit 1430 includes a diode 1440 coupled in series with a MOSFET 1442, and flyback circuit 1430 is coupled between coil voltage supply 1406 and the PH2 ground path 1410. When enabled, diode 1440 "free-wheels" the stored coil energy in the PH2 solenoid coils 1404, i.e., free-wheeling initiates immediately when FET 1414 is opened and continues for a limited duration after FET 1414 is opened. Diode 1440 is preferably a low forward voltage diode, such as a Schottky diode, a silicon diode, or a germanium diode. A lower forward voltage enables a slower dissipation of the coil current and, consequently, a more-steady coil current as FET 1414 is switched at a high frequency. Flyback circuit 1430, in certain embodiments, may further include a gate driver circuit (not shown) for gating MOSFET 1442. Alternatively, as shown in FIG. 14, MOSFET 1442 is enabled and disabled directly by a flyback control signal 1444 applied at a gate 1446 of MOSFET 1442.

Flyback control signal 1444 may be supplied, in certain embodiments, by controller 318 (shown in FIG. 3) or any other suitable controller or digital circuit. Generally, flyback control signal 1444 enables flyback circuit 1430 when the PH2 valve set and, more specifically, the PH2 solenoid coils 1404 are being supplied a high frequency PWM current signal by FET 1414, such as, for example, when the PH2 valve set is being held in the opened position. Further, flyback control signal 1444 disables flyback circuit 1430 when the coil currents in the PH2 solenoid coils 1404 should be dissipated quickly, such as, for example, when the PH2 valve set is transitioning from the opened position to the closed position.

Although systems and methods are described above with reference to an agricultural fluid dispensing apparatus, embodiments of the present disclosure are suitable for use with agricultural fluid application systems other than fluid dispensing apparatus. In some embodiments, for example, the systems and methods of the present disclosure are implemented in a fluid application system that injects fluid, such as fertilizer, into the soil through dispensing tubes, rather than nozzles. In yet other embodiments, systems and methods of the present disclosure may be implemented in any system, whether commercial, industrial or residential, that utilizes valves connected to a distribution conduit or distribution manifold, such as irrigation systems.

The systems and methods described herein provide for phased pulsing of valves of a fluid dispensing apparatus. For example, in fluid dispensing apparatus within which the systems and methods may be embodied or carried out, actuation of valves may be separated by a phase offset and a sub-phase offset. Accordingly, the operating efficiency and accuracy of the fluid dispensing apparatus may be increased. In addition, variations in instantaneous flow within a distribution conduit of the fluid dispensing apparatus may be reduced. Also, fluctuations in electrical current required to regulate the valves is reduced. As a result, the cost to operate and maintain the fluid dispensing apparatus may be decreased. Further, as described above, current supplied to respective solenoid coils of the valves may be pulse-width modulated (PWM) to improve power efficiency and, moreover, may be combined with a controlled flyback circuit to further reduce average power consumption of the respective solenoid coils. In yet other embodiments of the systems and methods described herein, utilizing sub-phase offsets, PWM energizing of the solenoid coils, and controlled flyback circuits may all be combined to achieve reduction in peak power consumption, better distribution of power consumption over time, and overall reduction in average power consumption by a given valve. Further, in such a combination, the valves would exhibit improved operating efficiency of nozzle assemblies and mitigation of problems associated with varying instantaneous fluid flow, including water hammer, pressure fluctuations, and flowmeter inconsistencies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method of dispensing fluid from a fluid dispensing apparatus including a plurality of electrically-actuated valves, the method comprising:

supplying fluid to a distribution conduit of the fluid dispensing apparatus, the valves being connected to the distribution conduit and configured to regulate fluid flow out of the distribution conduit, the plurality of valves including a plurality of valve sub-sets including a first sub-set and a second sub-set;

determining a phase offset to separate actuation of the plurality of valve sub-sets into phases;

determining a sub-phase offset to separate actuation of valves within each of the plurality of valve sub-sets based on the number of the plurality of valves and a cycle time of the valves;

sequentially actuating valves in the first sub-set based on the sub-phase offset such that at least one valve in the first sub-set is actuated out of phase from a preceding valve in the first sub-set by the sub-phase offset; and sequentially actuating valves in the second sub-set based on the phase offset and the sub-phase offset such that (i) at least one valve in the second sub-set is actuated out of phase from a preceding valve in the first sub-set by the phase offset; and (ii) the at least one valve in the second sub-set is actuated out of phase from a preceding valve in the second sub-set by the sub-phase offset.

2. The method of claim 1, wherein the first sub-set includes a first valve and a third valve, and the second sub-set includes a second valve and a fourth valve, said method further comprises:

actuating the first valve at a first time to allow fluid to flow out of the distribution conduit;

actuating the second valve at a second time to allow fluid to flow out of the distribution conduit, wherein the second time is offset from the first time by the phase offset; and actuating the third valve at a third time to allow fluid to flow out of the distribution conduit, wherein the third time is offset from the first time by the sub-phase offset.

3. The method of claim 2 further comprising actuating the fourth valve at a fourth time to allow fluid to flow out of the distribution conduit, wherein the fourth time is offset from the second time by the sub-phase offset.

4. The method of claim 1, wherein the first sub-set includes a first valve and a third valve, and the second sub-set includes a second valve and a fourth valve, said method further comprising:

actuating the first valve at a first time to restrict fluid flow out of the distribution conduit;

actuating the second valve at a second time to restrict fluid flow out of the distribution conduit, wherein the second time is offset from the first time by the phase offset; and actuating the third valve at a third time to restrict fluid flow out of the distribution conduit, wherein the third time is offset from the first time by the sub-phase offset.

5. The method of claim 4 further comprising actuating the fourth valve at a fourth time to restrict fluid flow out of the distribution conduit, wherein the fourth time is offset from the second time by the sub-phase offset.

6. The method of claim 1, wherein determining a sub-phase offset comprises determining a first sub-phase offset to separate actuation of the valves within the first sub-set and determining a second sub-phase offset to separate actuation of the valves within the second sub-set.

7. The method of claim 6, wherein the second sub-phase offset is equal to the first sub-phase offset.

8. The method of claim 1, wherein each valve includes a solenoid coil and a poppet, the method further comprising supplying electrical current to the solenoid coil to move the poppet.

9. The method of claim 1, wherein each valve is pulsed according to a duty cycle and the cycle time, wherein determining the phase offset includes dividing the cycle time by the number of valve sub-sets in the plurality of valve sub-sets.

10. The method of claim 1, wherein determining the sub-phase offset includes dividing the cycle time of the valves by the number of the plurality of valves.

11. A fluid dispensing apparatus comprising:
a plurality of electrically-actuated valves;
a distribution conduit connected to a fluid supply, wherein each valve is connected to the distribution conduit and configured to regulate fluid flow out of the distribution conduit, the plurality of valves including a plurality of valve sub-sets including a first sub-set and a second sub-set; and
a controller communicatively connected to the plurality of valves, the controller configured to:
determine a phase offset to separate actuation of the plurality of valve sub-sets into phases;
determine a sub-phase offset to separate actuation of valves within each of the plurality of valve sub-sets based on the number of the plurality of valves and a cycle time of the valves;
sequentially actuate valves in the first sub-set based on the sub-phase offset such that actuation of at least one valve in the first sub-set is out of phase from actuation of a preceding valve in the first sub-set by the sub-phase offset; and
sequentially actuate valves in the second sub-set based on the phase offset and the sub-phase offset such that (i) at least one valve in the second sub-set is actuated out of phase from a preceding valve in the first sub-set by the phase offset; and (ii) the at least one valve in the second sub-set is actuated out of phase from a preceding valve in the second sub-set by the sub-phase offset.

12. The fluid dispensing apparatus of claim 11, wherein the first sub-set includes a first valve and a third valve, and the second sub-set includes a second valve and a fourth valve, wherein the controller is further configured to:

actuate the first valve at a first time to allow fluid to flow out of the distribution conduit;

actuate the second valve at a second time to allow fluid to flow out of the distribution conduit, wherein the second time is offset from the first time by the phase offset; and actuate the third valve at a third time to allow fluid to flow out of the distribution conduit, wherein the third time is offset from the first time by the sub-phase offset.

13. The fluid dispensing apparatus of claim 12, wherein the second valve is adjacent the first valve and the third valve is adjacent the fourth valve.

14. The fluid dispensing apparatus of claim 12, wherein the controller is further configured to actuate the fourth valve at a fourth time to allow fluid to flow out of the distribution conduit, wherein the fourth time is offset from the second time by the sub-phase offset.

15. The fluid dispensing apparatus of claim 11, wherein the first sub-set includes a first valve and a third valve, and the second sub-set includes a second valve and a fourth valve, wherein the controller is further configured to actuate the first valve at a first time to restrict fluid flow out of the distribution conduit, actuate the second valve at a second time to restrict fluid flow out of the distribution conduit, and actuate the third valve at a third time to restrict fluid flow out of the distribution conduit, wherein the second time is offset from the first time by the phase offset, and the third time is offset from the first time by the sub-phase offset.

16. The fluid dispensing apparatus of claim 15, wherein the controller is configured to actuate the fourth valve at a fourth time to restrict fluid flow out of the distribution conduit, wherein the fourth time is offset from the second time by the sub-phase offset.

17. The fluid dispensing apparatus of claim 11, wherein each valve includes a solenoid coil and a poppet configured to move in response to electrical current supplied to the solenoid coil.

18. The fluid dispensing apparatus of claim 17, wherein the controller is configured to regulate the electrical current supplied to the solenoid coil of each valve.

19. The fluid dispensing apparatus of claim 11 further comprising a plurality of nozzles configured to dispense fluid from the fluid dispensing apparatus, each valve of the plurality of valves connected to a corresponding nozzle of the plurality of nozzles, wherein each valve is configured to regulate fluid flow from the distribution conduit and through the corresponding nozzle.

20. A method of dispensing fluid from a fluid dispensing apparatus including a plurality of electrically-actuated valves, the method comprising:
supplying fluid to a distribution conduit of the fluid dispensing apparatus, the valves being connected to the distribution conduit and configured to regulate fluid flow out of the distribution conduit, the plurality of valves including a plurality of valve sets including a first set and a second set, each of the first and second sets including a plurality of valve sub-sets;
determining a phase offset to separate actuation of the plurality of valve sets into phases;
determining a sub-phase offset to separate actuation of valve sub-sets within each of the plurality of valve sets, wherein the sub-phase offset is determined based on the number of the plurality of valve sets and a cycle time of the valves;
sequentially actuating valve sub-sets in the first set based on the sub-phase offset such that each valve sub-set in the first set is actuated out of phase from a preceding valve sub-set in the first set by the sub-phase offset; and
sequentially actuating valve sub-sets in the second set based on the phase offset and the sub-phase offset such that (i) each valve sub-set in the second set is actuated out of phase from a preceding valve sub-set in the first set by the phase offset; and (ii) each valve sub-set in the second set is actuated out of phase from a preceding valve sub-set in the second set by the sub-phase offset.

21. The method of claim 20, wherein each of the plurality of valve sub-sets comprises a plurality of valves.

22. The method of claim 20, wherein each of the plurality of valve sub-sets consists of a single valve.

23. The method of claim 20, wherein determining a sub-phase offset comprises determining a first sub-phase offset to separate actuation of the valve sub-sets within the first set and determining a second sub-phase offset to separate actuation of the valve sub-sets within the second set.

24. The method of claim 23, wherein the second sub-phase offset is equal to the first sub-phase offset.

25. The method of claim 20, wherein each valve is pulsed according to a duty cycle and the cycle time, wherein determining the phase offset includes dividing the cycle time by the number of valve sets in the plurality of valve sets.

26. The method of claim 20, wherein determining the sub-phase offset includes dividing the cycle time of the valves by the number of the plurality of valve sub-sets.

\* \* \* \* \*